United States Patent
Ofek

(12) 
(10) Patent No.: US 6,259,695 B1
(45) Date of Patent: Jul. 10, 2001

(54) PACKET TELEPHONE SCHEDULING WITH COMMON TIME REFERENCE

(75) Inventor: Yoram Ofek, Riverdale, NY (US)

(73) Assignee: Synchrodyne Networks, Inc.

( * ) Notice: Subject to any disclaimer, the term of this patent is extended or adjusted under 35 U.S.C. 154(b) by 0 days.

(21) Appl. No.: 09/362,335

(22) Filed: Jul. 28, 1999

Related U.S. Application Data

(63) Continuation of application No. 09/120,636, filed on Jul. 22, 1998.
(60) Provisional application No. 60/088,983, filed on Jun. 11, 1998.

(51) Int. Cl.[7] .................................................. H04L 12/28
(52) U.S. Cl. ......................... 370/389; 370/503; 370/517
(58) Field of Search ................................... 370/395, 396, 370/397, 398, 399, 392, 498, 509, 517, 252, 253, 465, 503, 519, 353, 356, 389; 709/238

(56) References Cited

U.S. PATENT DOCUMENTS

| | | | |
|---|---|---|---|
| 4,926,418 | 5/1990 | Cidon et al. | 370/85.5 |
| 5,870,562 | * 2/1999 | Butman | 709/238 |
| 5,896,388 | * 4/1999 | Earnest | 370/395 |

OTHER PUBLICATIONS

R.W. Kembel, "The FibreChannel Consultant: Arbitrated Loop", Connectivity Solutions, Tucson, AZ, Chapters 1 and 2, pp. 1–47.
W. Stallings, "ISDN An Introduction", MacMilliam Publishing Co., NY (1989), pp. 119–122.
P. Dana, "Global Positioning System (GPS) Time Dissemination for Real–Time Applications", Real–Time Systems, 12, 9–40 (1997), Kluwer Academic Publishers, Boston, MA, pp 9–40.

A. Jacob, "A Survey of Fast Packet Switches", Computer Committee Review, IEEE, Jan. 1990, pp. 54–64.
A.G. Fraser, "Early Experiments with Asynchronous Time Division Networks", IEEE Networks, Jan. 1993, pp 12–26.
M. Hamdi et al., "Voice Service Interworking for PSTN and IP Networks", IEEE Communications Magazine, May 1999, pp 104–111.
J.C. Bellamy, "Digital Network Synchronization", IEEE Communications Magazine, Apr. 1995, pp. 70–83.
E.W. Zegura, "Architectures for ATM Switching Systems", IEEE Communications Magazine, Feb. 1993, pp. 28–37.
A. Pattavina, "Nonblocking Architectures for ATM Switching", IEEE Communications Magazine, Feb. 1993, pp. 38–48.
*Serial Storage Architecture A Technology Overview*, version 3.0, SSA Industry Association 1995, pp. 1–43.

(List continued on next page.)

Primary Examiner—Douglas Olms
Assistant Examiner—Ricardo M. Pizarro
(74) Attorney, Agent, or Firm—Sitrick & Sitrick

(57) ABSTRACT

The invention describes a method for interfacing a packet-switched network with real-time streams from various sources, such as circuit-switched telephony network sources. The network interfaces and gateways maintain a common time reference (CmR), which is obtained either from an external source (such as GPS—Global Positioning System) or is generated and distributed internally. A data packet that is packetized at the gateway is scheduled to be forwarded to the network in a predfined time that is responsive to the common time reference. The invention relates, in particular, to timely forwarding and delivery of data packet between voice over IP (VoIP) gateways. Consequently, the invention provides a routing service between any two VoIP gateways where the end-to-end performance parameters, such as loss, delay and jitter, have deterministic guarantees. Furthermore, the invention enables gateway functions with minimum delay.

49 Claims, 23 Drawing Sheets

VoIP GW: analog to digital conversion /digital processing packetization

OTHER PUBLICATIONS

Y. Ofek, "Overview of the MetaRing Architecture", *Computer Networks and ISDN Systems*, vol. 26 (1994), pp. 817–829.

M. Baldi, et al., "End–to–End Delay Analysis of Videoconferencing Over Packet Switched Networks", IEEE Infocom, Jan. 29, 1998, Title page and pp. 1–27.

S.J.Golestani, "A Framing Strategy for Congestion Management", IEEE *Journal on Selected Areas in Communications*, vol. 9, No. 7, Sep. 1991, pp. 1064–1077.

Li et al., "Pseudo–isonchronous Cell Forwarding", *Computer Networks and ISDN Systems*, vol. 30 (1998), pp. 2359–2372.

Li et al., "Time–driven Priority' Flow Control for Real–time Heterogeneous Internetworking", *Proceedings of Infocom*, vol. 15, Los Alamitos, CA. Mar. 1996, pp. 189–197.

\* cited by examiner

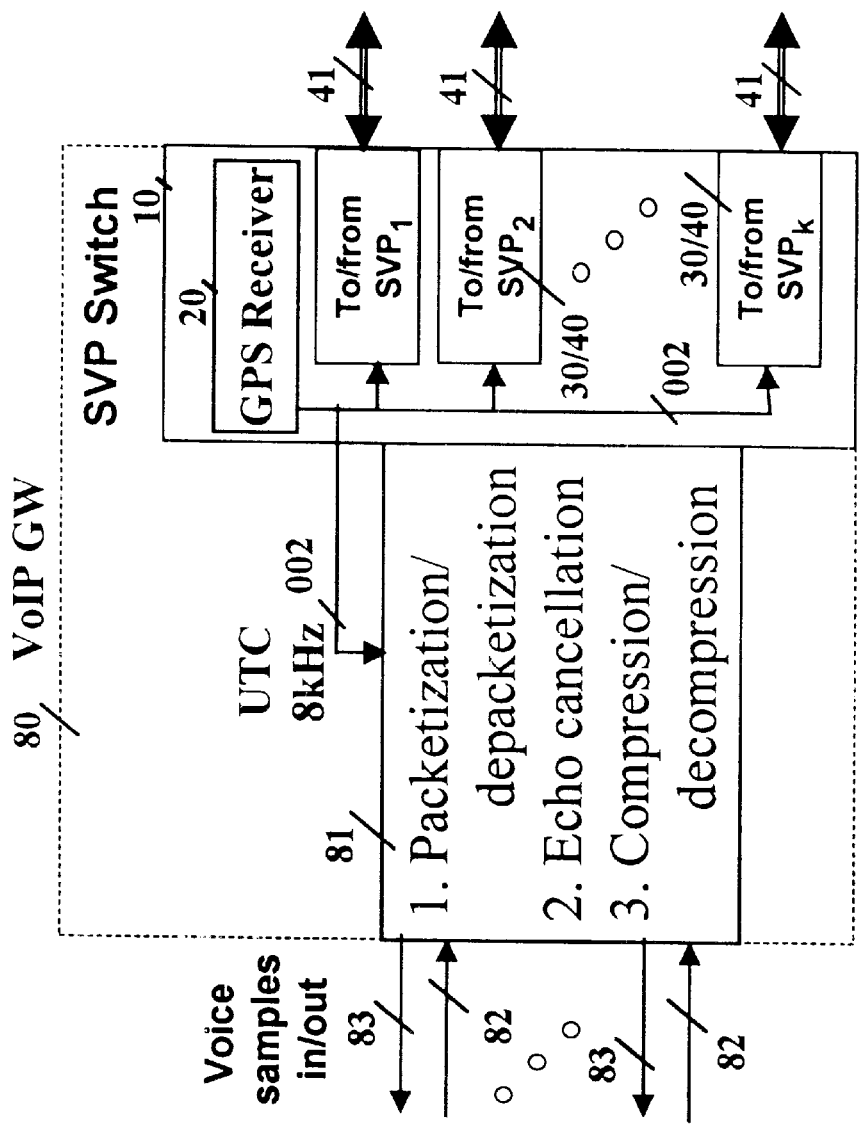
FIG. 1 VoIP GW: analog to digital conversion /digital processing packetization

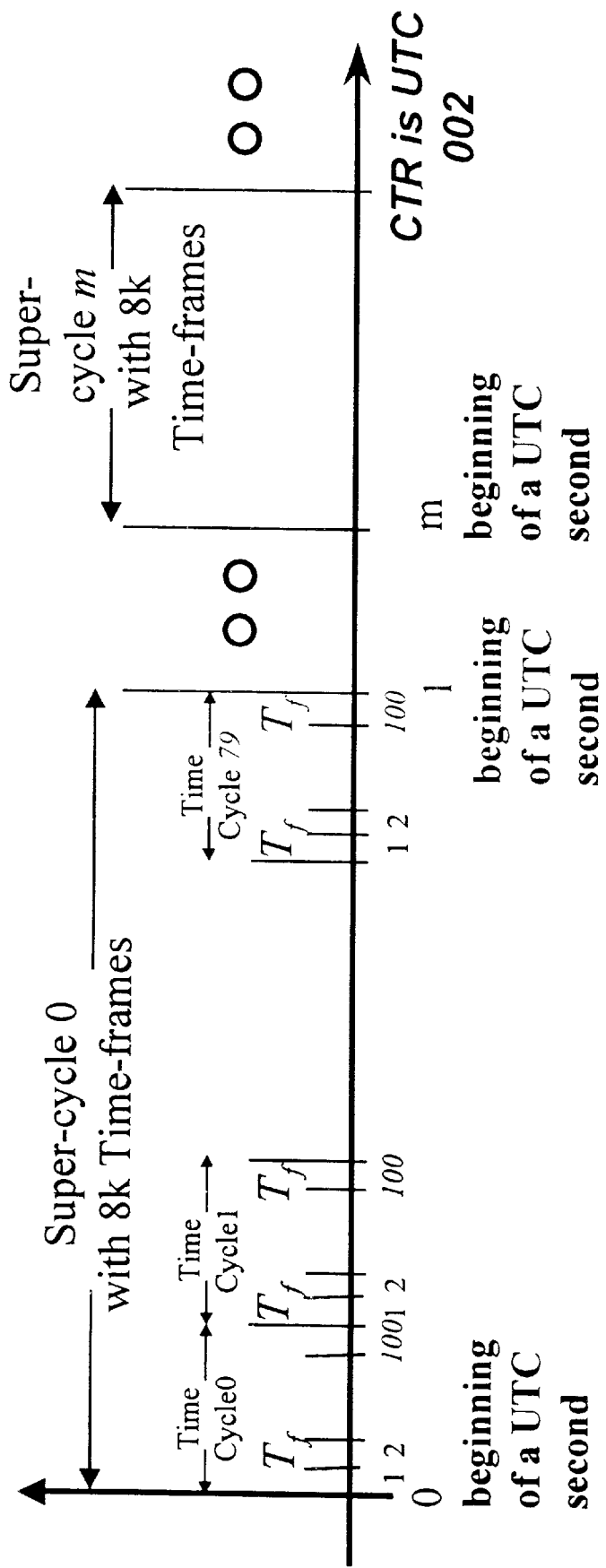
FIG. 2 (6 INT) Global common time reference

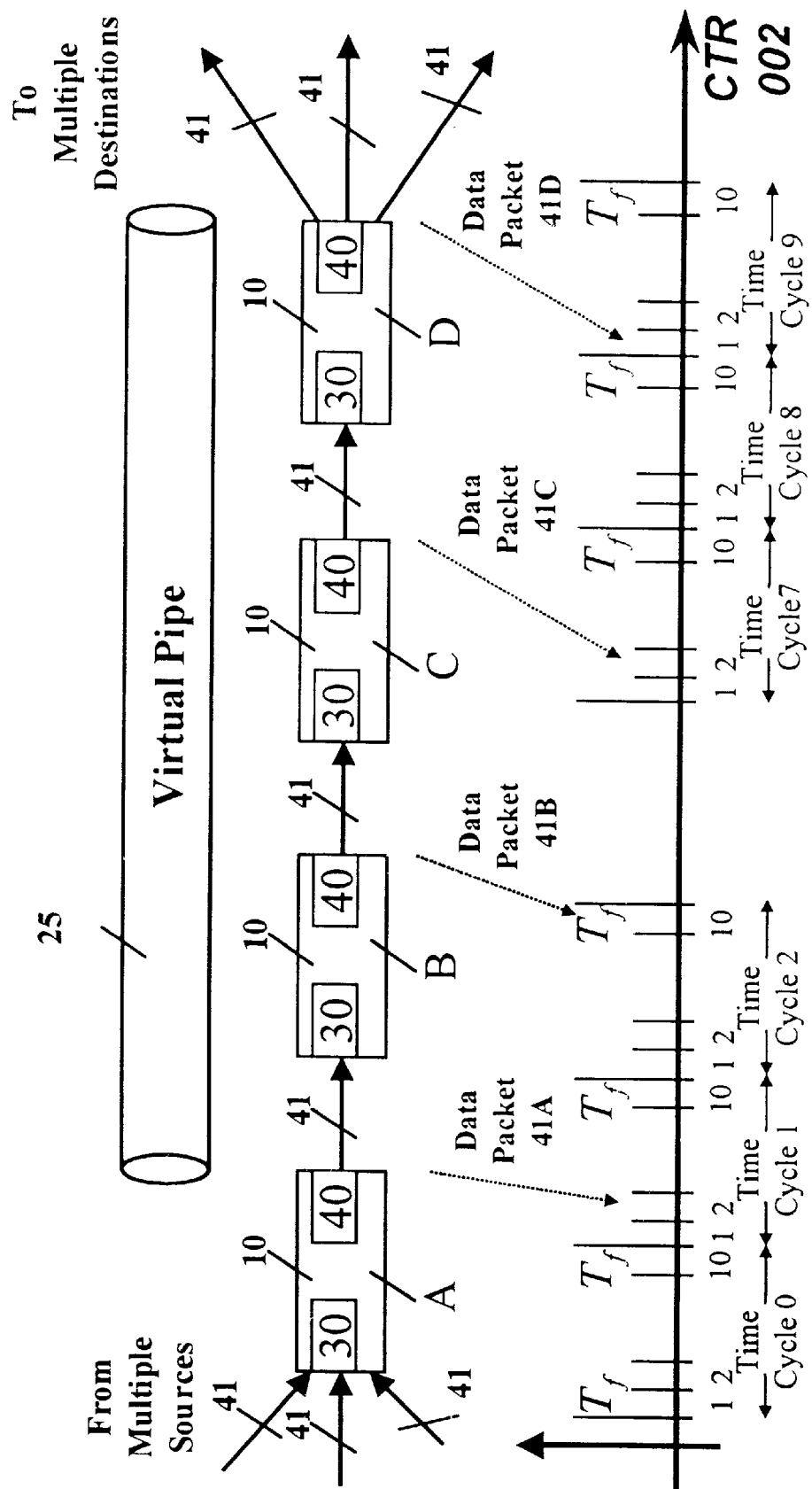
FIG. 3 (1 INT) Synchronous virtual pipe (SVP)

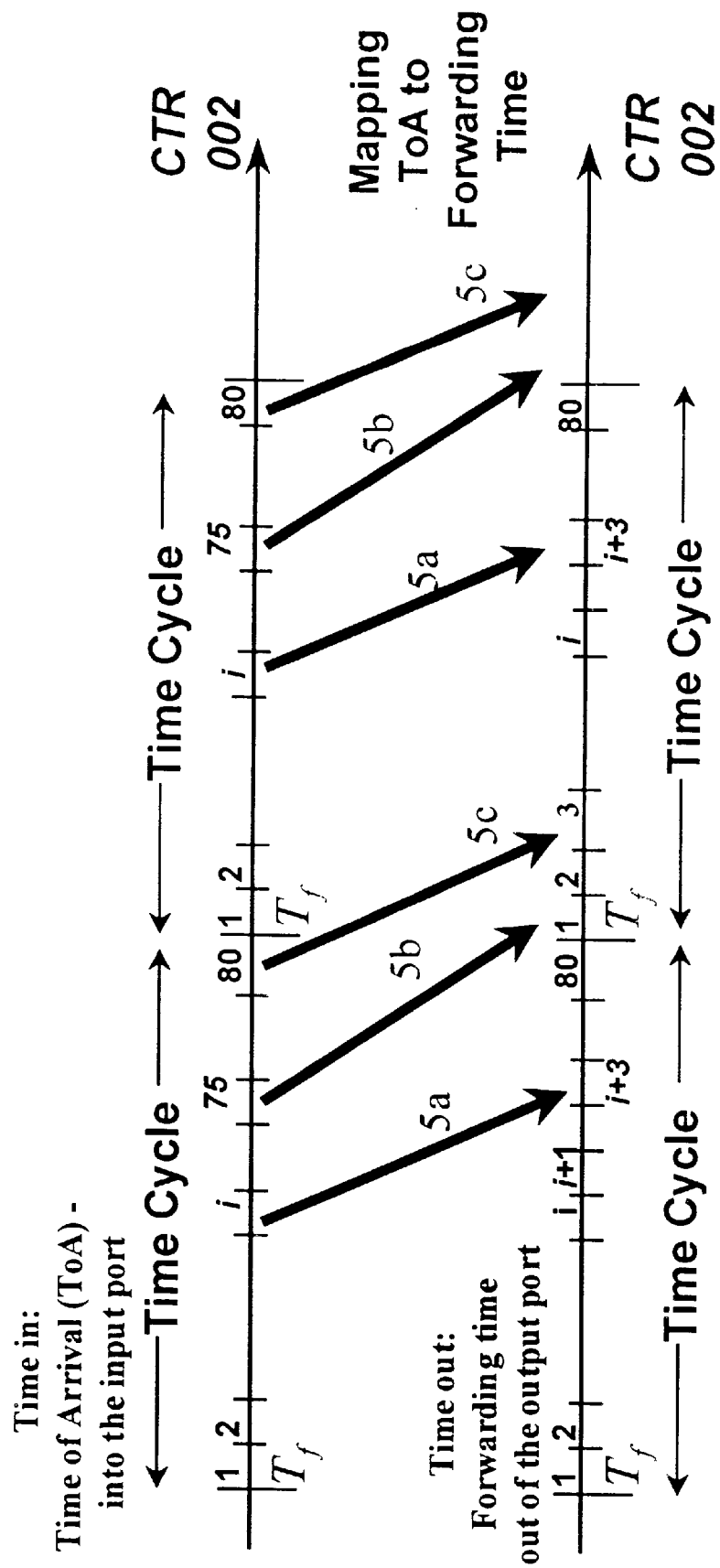
FIG. 4 (8 INT) Periodic scheduling and forwarding

FIG. 5B

4B/5B encoding scheme

| HEX DATA | 4-bit Binary Data | 5-bit Codeword |
|---|---|---|
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

FIG. 5C

4B/5B encoding scheme

| HEX DATA | Control Input Binary Data | 10-bit Codeword |
|---|---|---|
| 1 | 0001 | 11111 11111 |
| 2 | 0010 | 01101 01101 |
| 3 | 0011 | 01101 11001 |
| 4 | 0100 | 11111 00100 |
| 5 | 0101 | 01101 00111 |
| 6 | 0110 | 11001 00111 |
| 7 | 0111 | 11001 11001 |
| 8 | 1000 | 00100 00100 |
| 9 | 1001 | 00100 11111 |
| A | 1010 | 00100 00000 |
| B | 1011 | 00111 00111 |
| C | 1100 | 00111 11001 |
| D | 1101 | 00000 00100 |
| E | 1110 | 00000 11111 |
| F | 1111 | 00000 00000 |

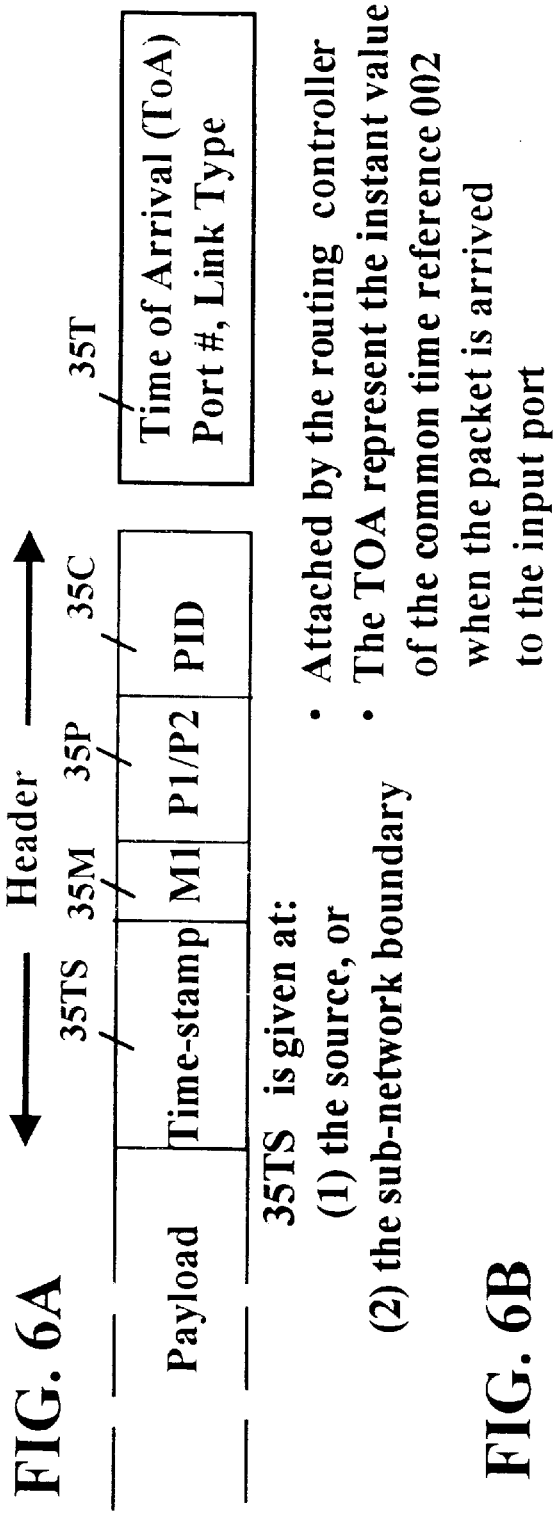

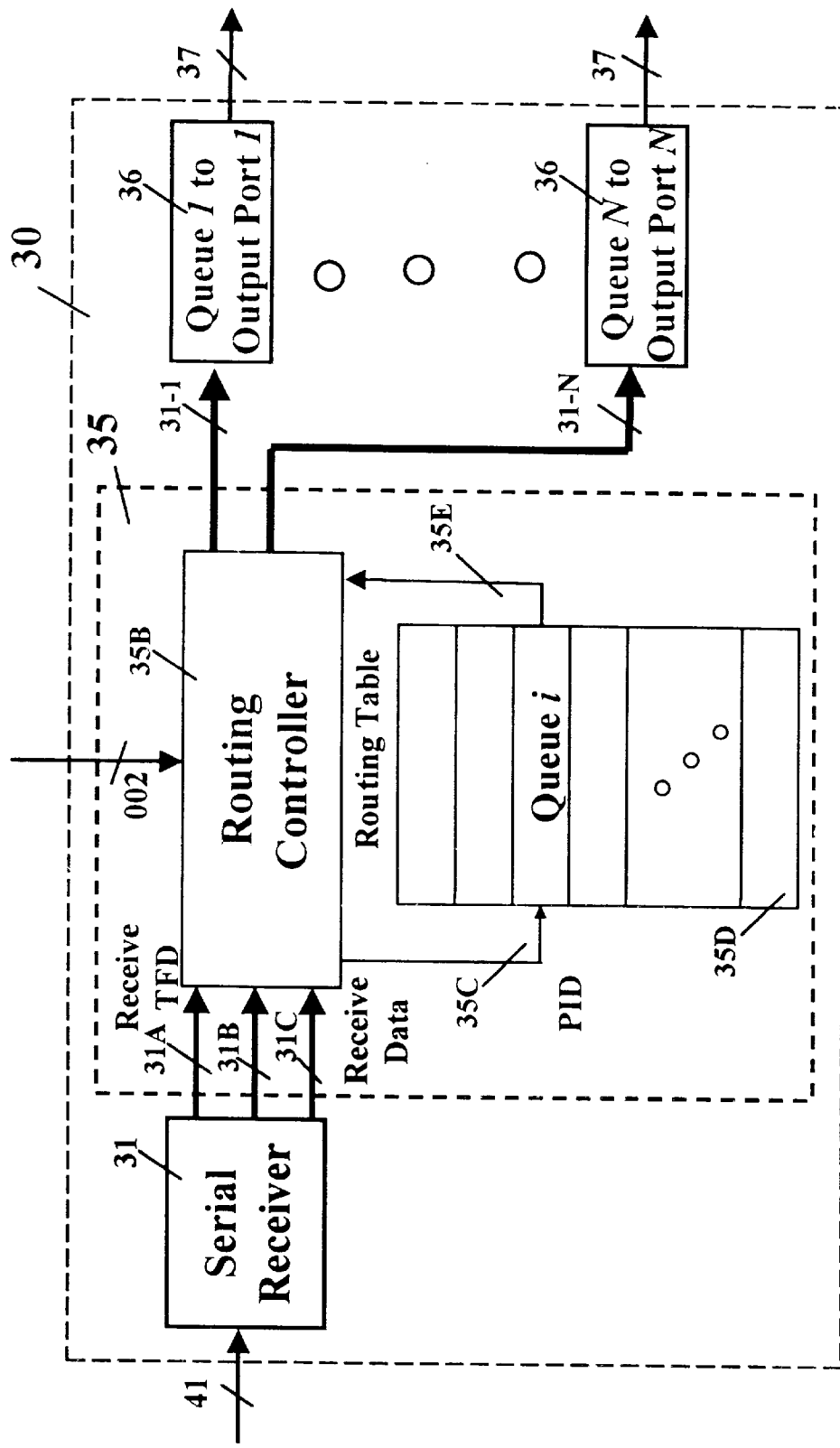
FIG. 7 (INT 12-13) The input port 30 of an SVP switch 10

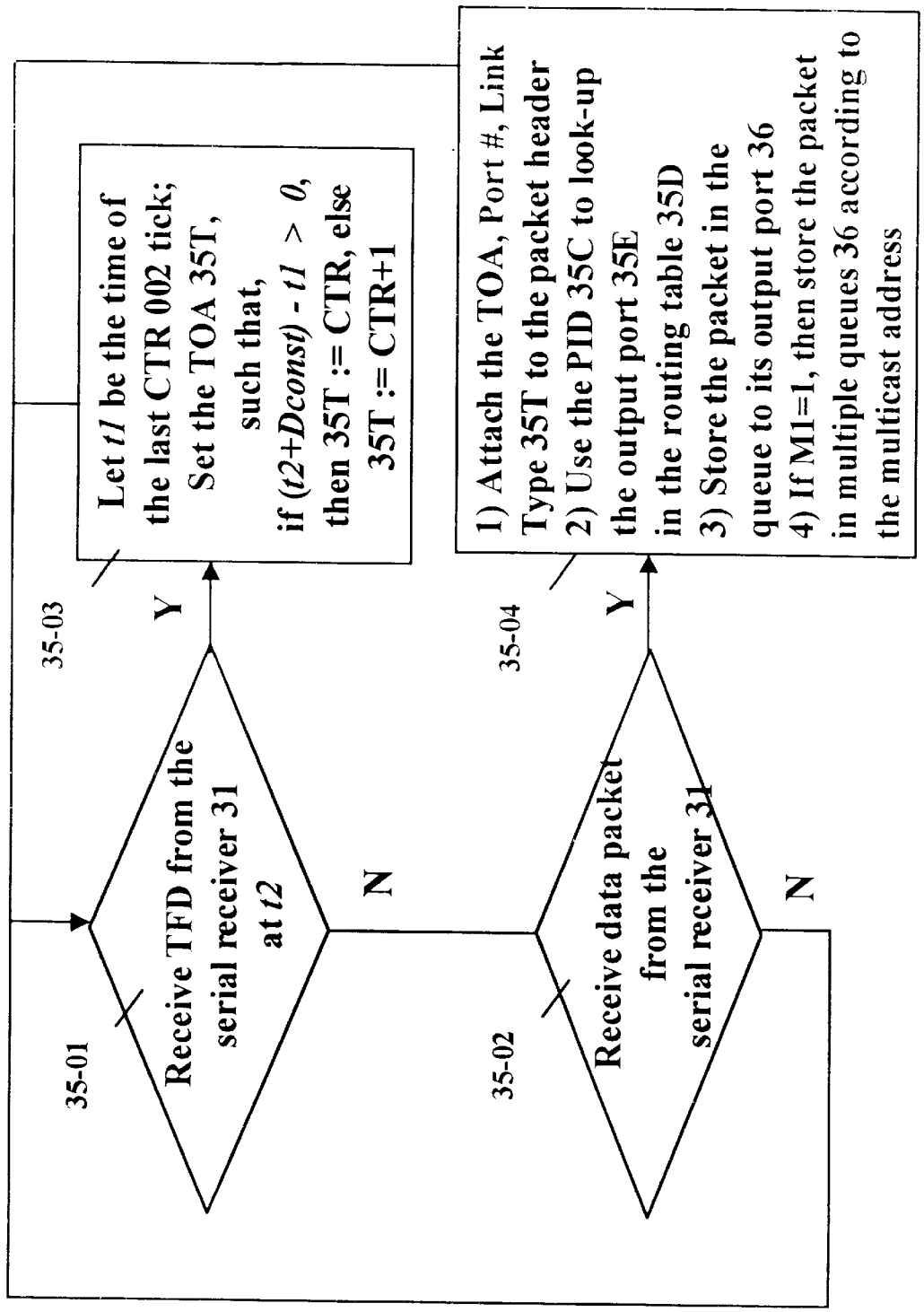
FIG. 8 (INT 14) The routing controller operation

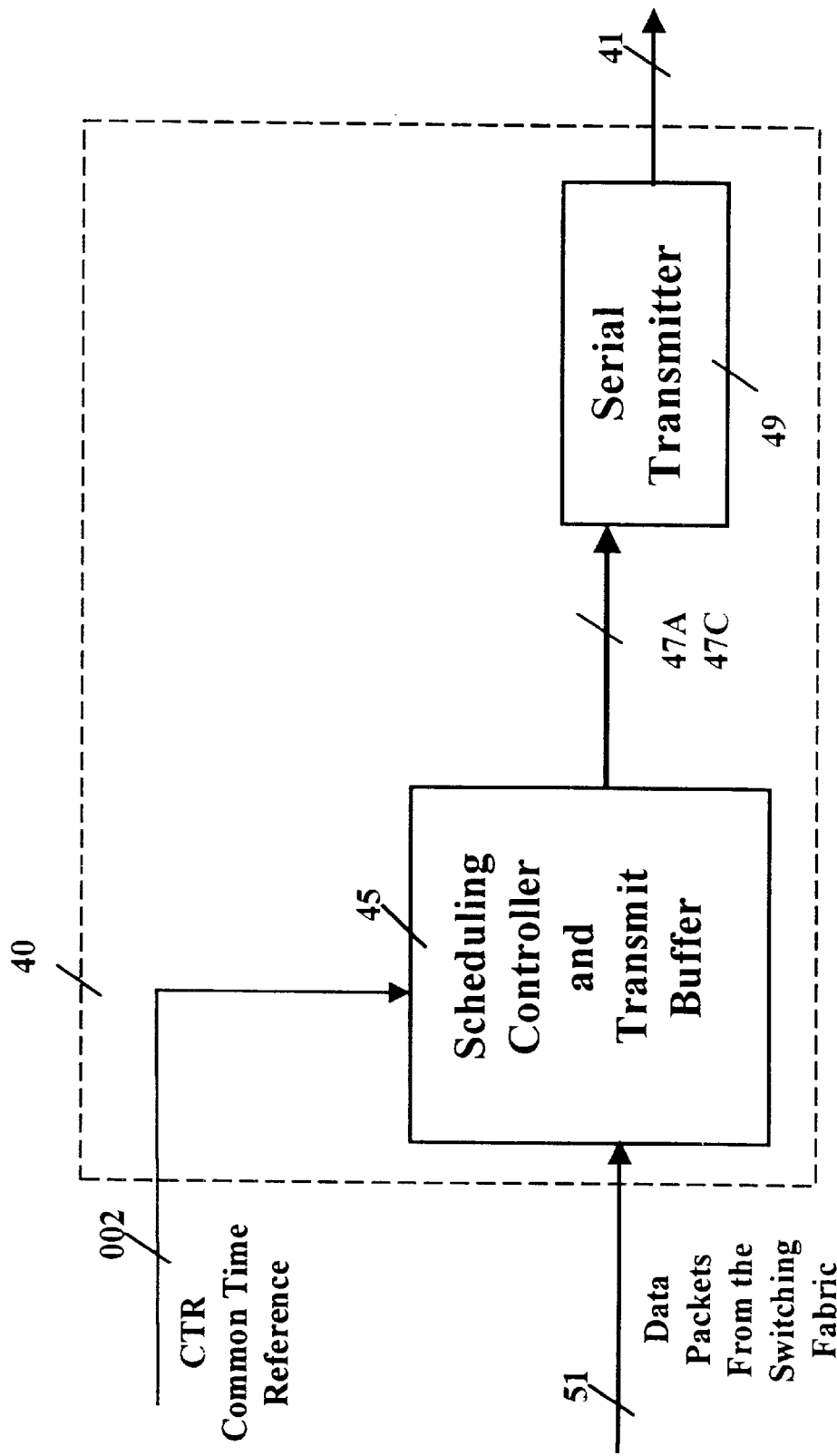
FIG. 9 (INT16) The output port 40 of an SVP switch 10

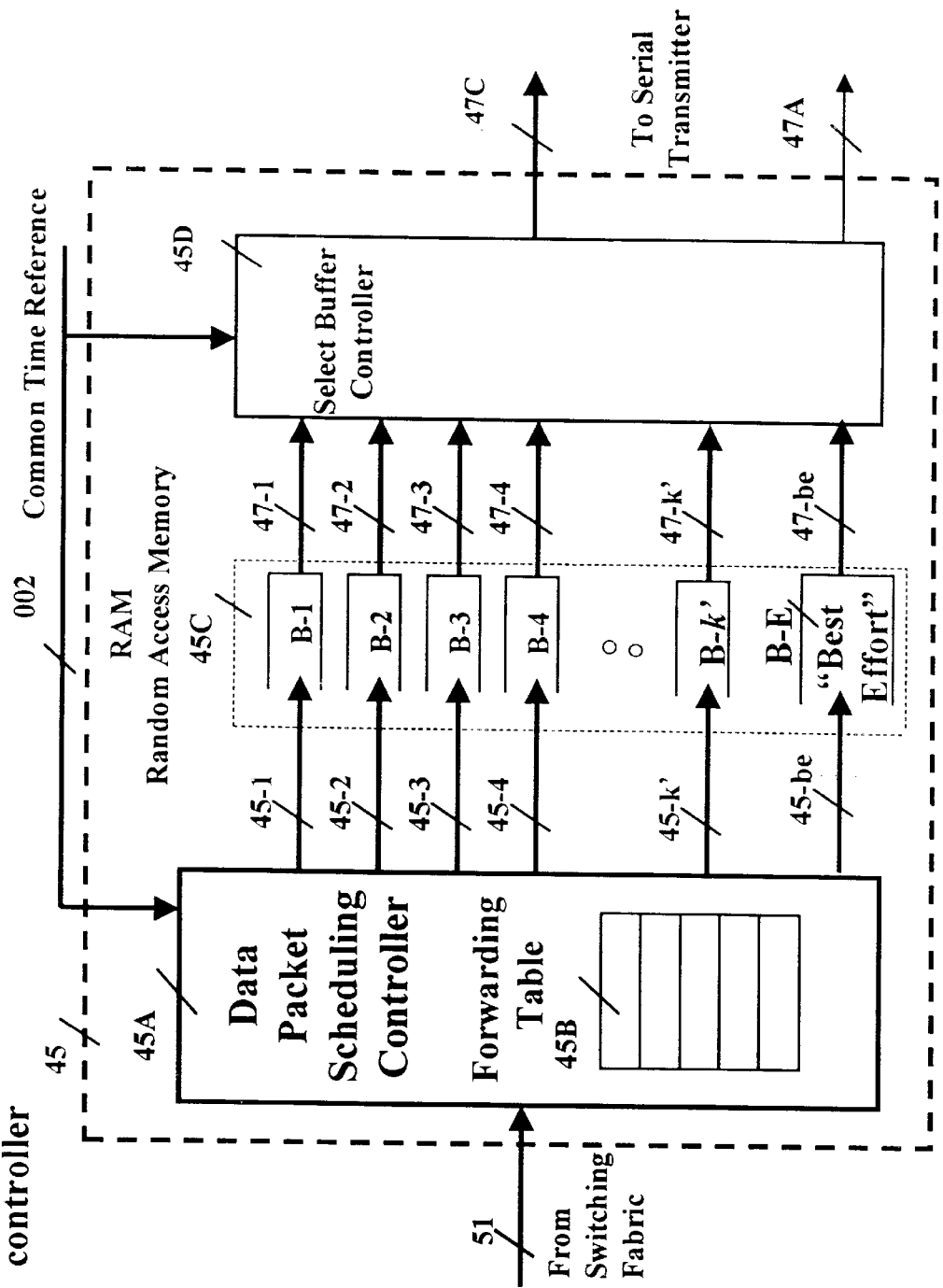
FIG. 10 (INT 19) Scheduling controller and transmit buffer 45 with two parts: data packet scheduling controller and select buffer controller

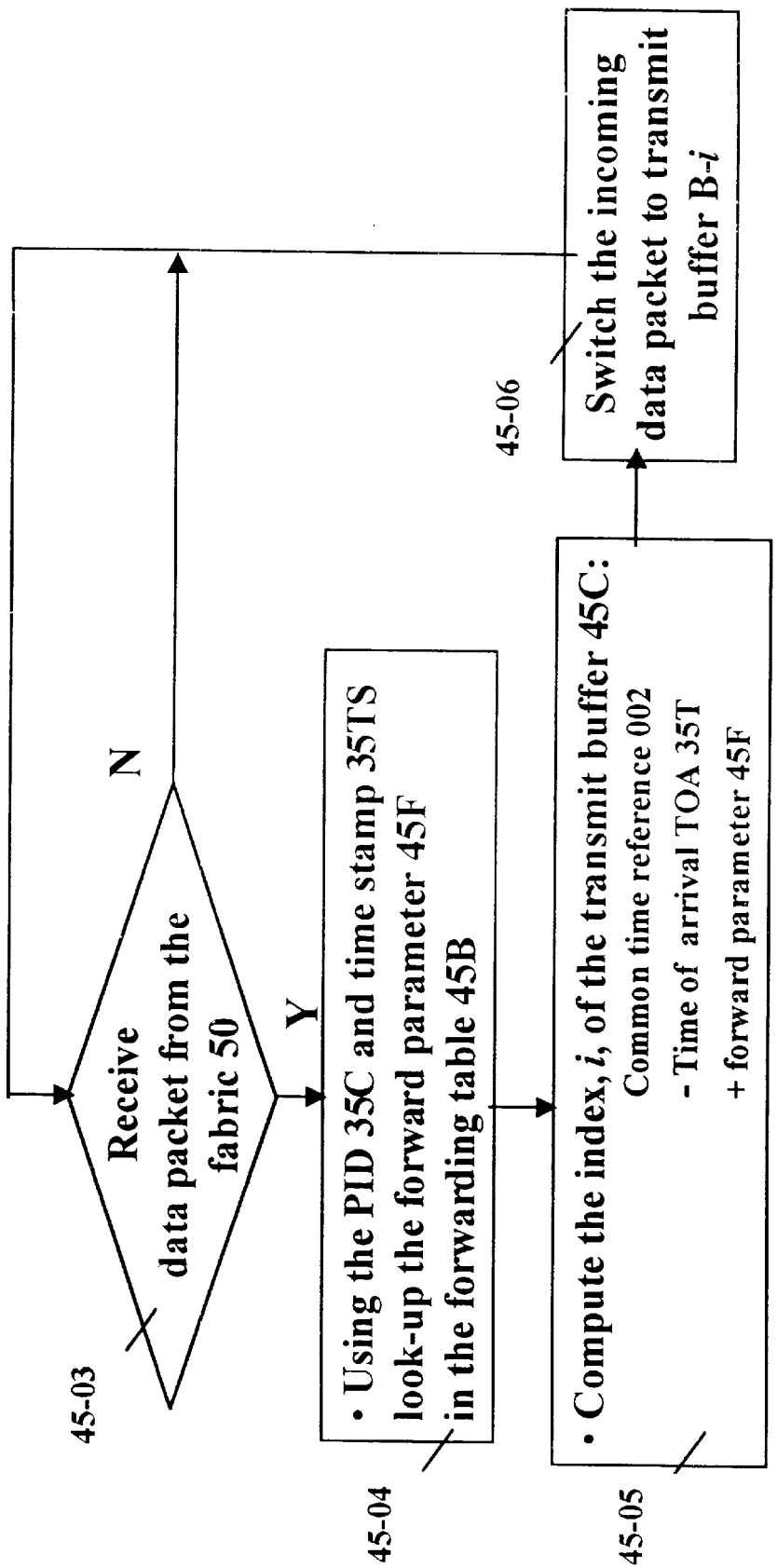
FIG. 11 (INT 20) The data packet scheduling controller operation

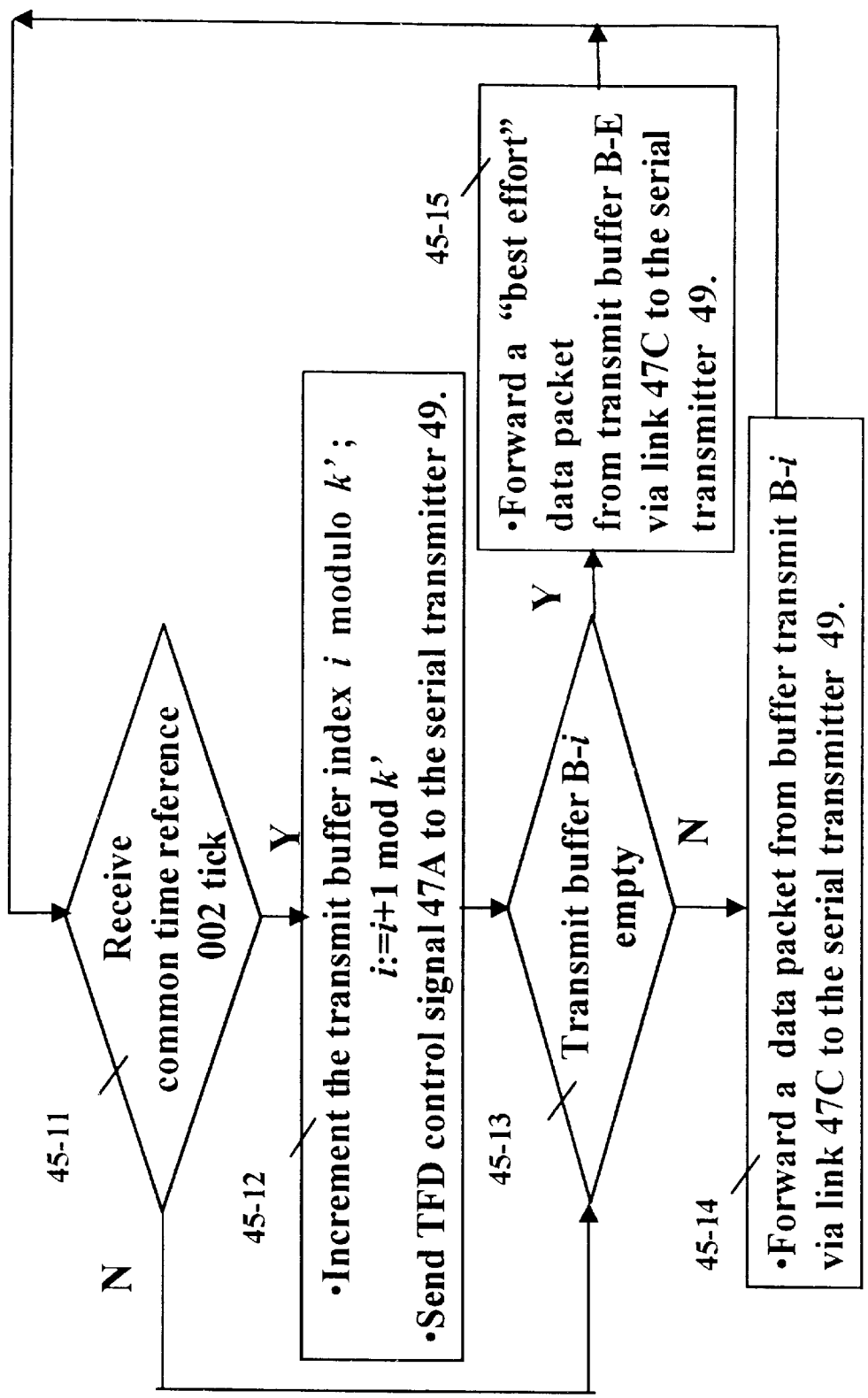
FIG. 12 (INT 21) The select buffer controller operation

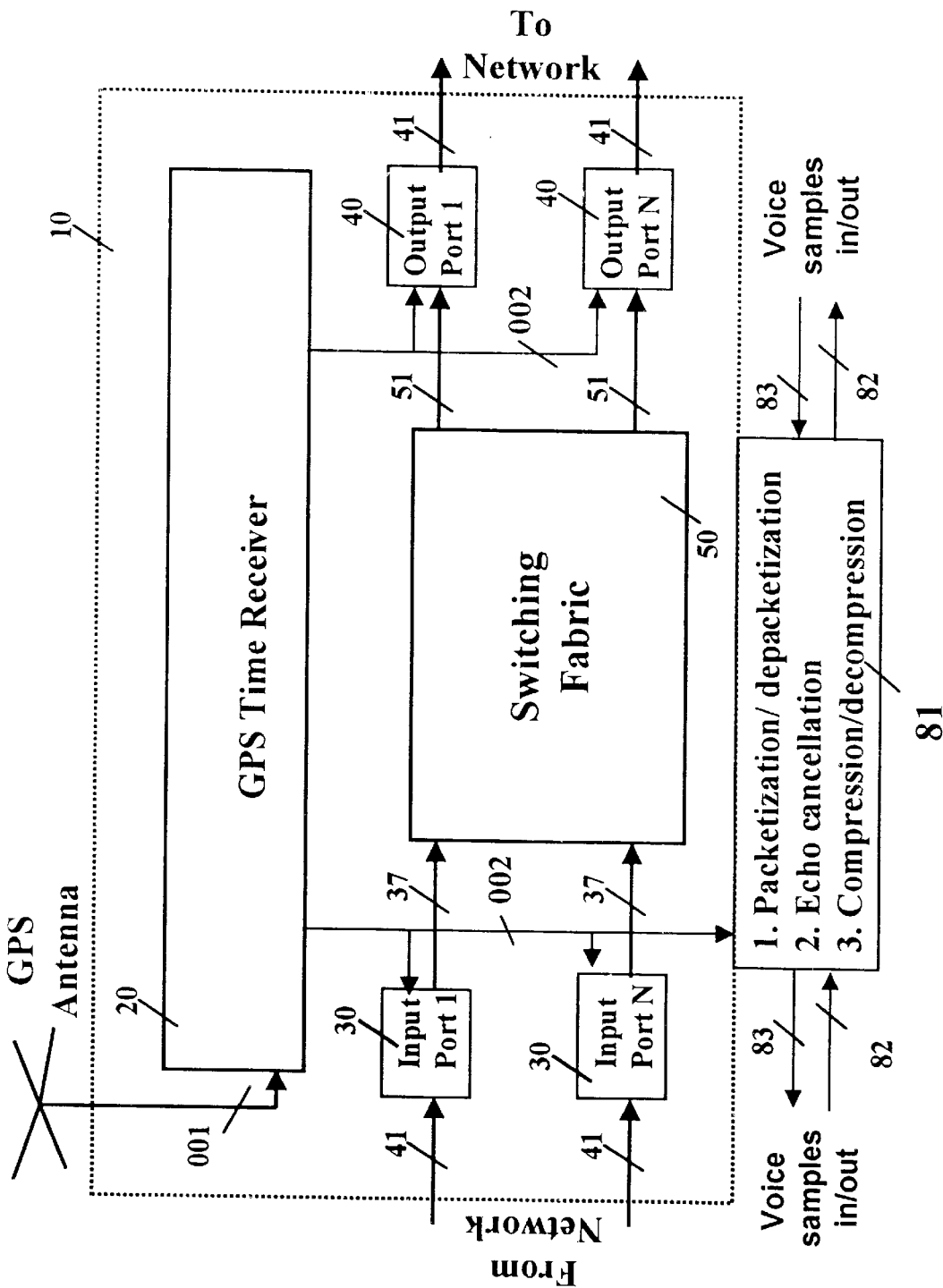
FIG. 13 (5 INT) Synchronous virtual pipe switch

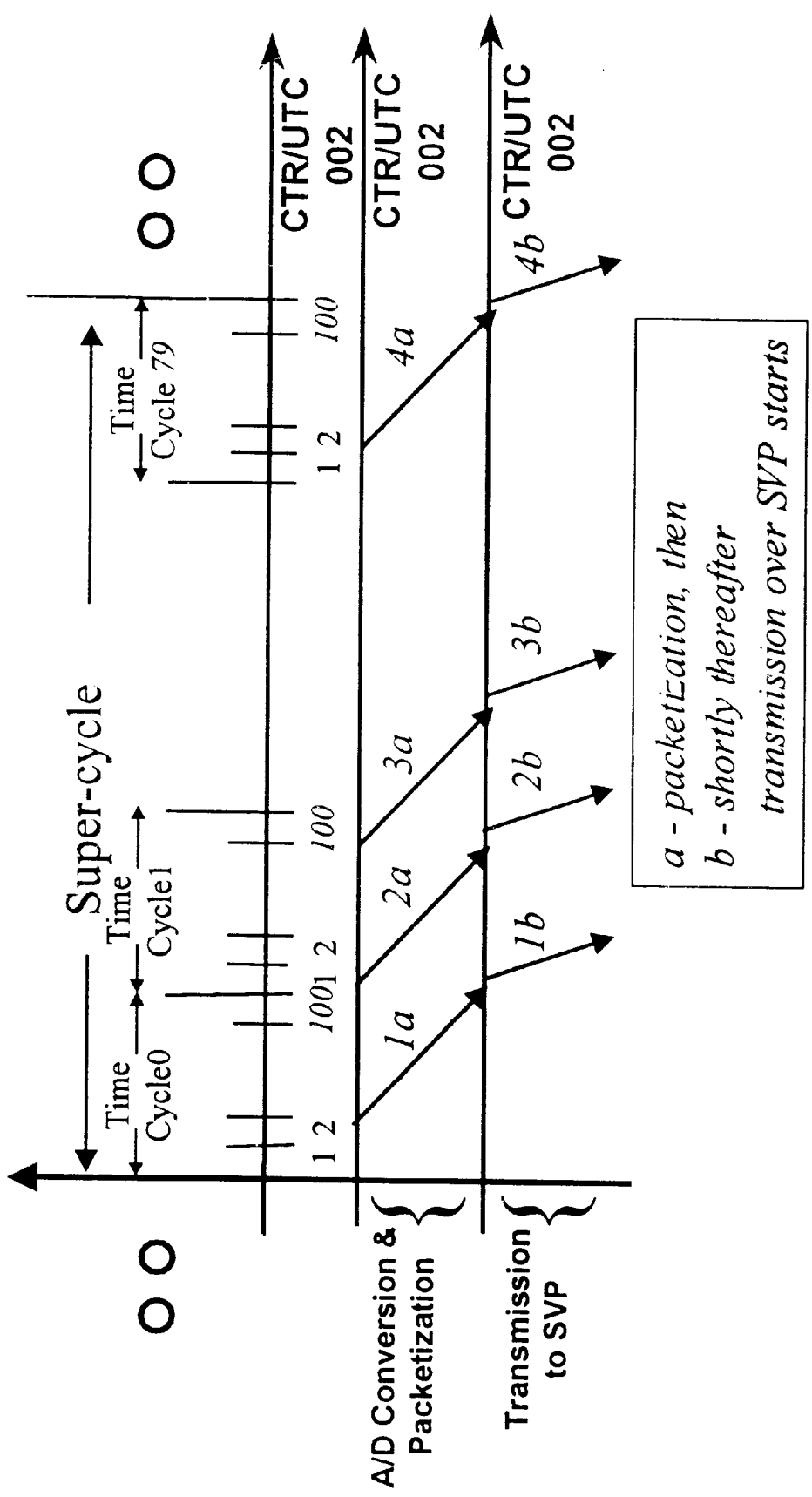
FIG. 14 Packetization & transmission

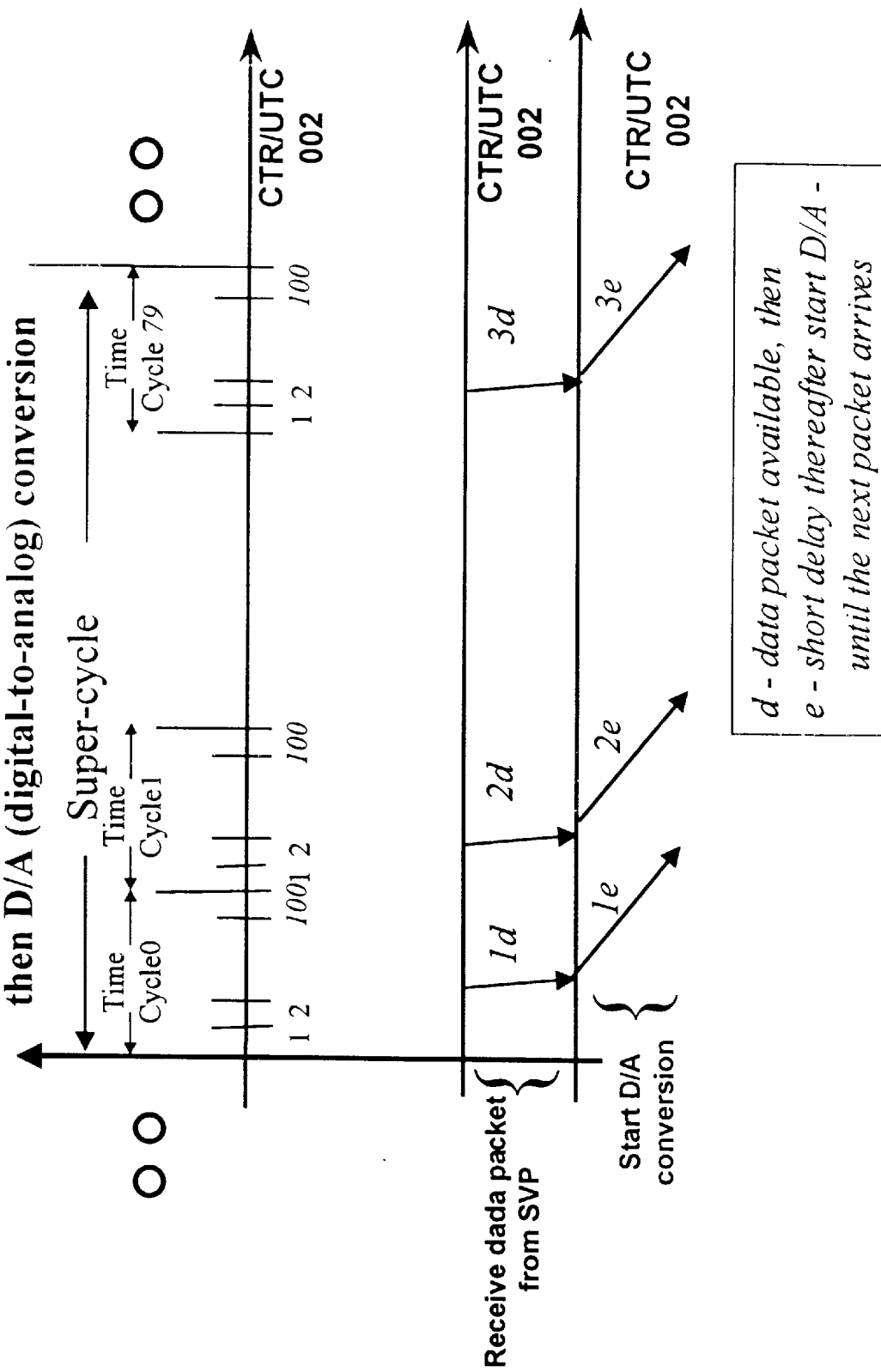
FIG. 15 Receiving data packets, depacketization, then D/A (digital-to-analog) conversion

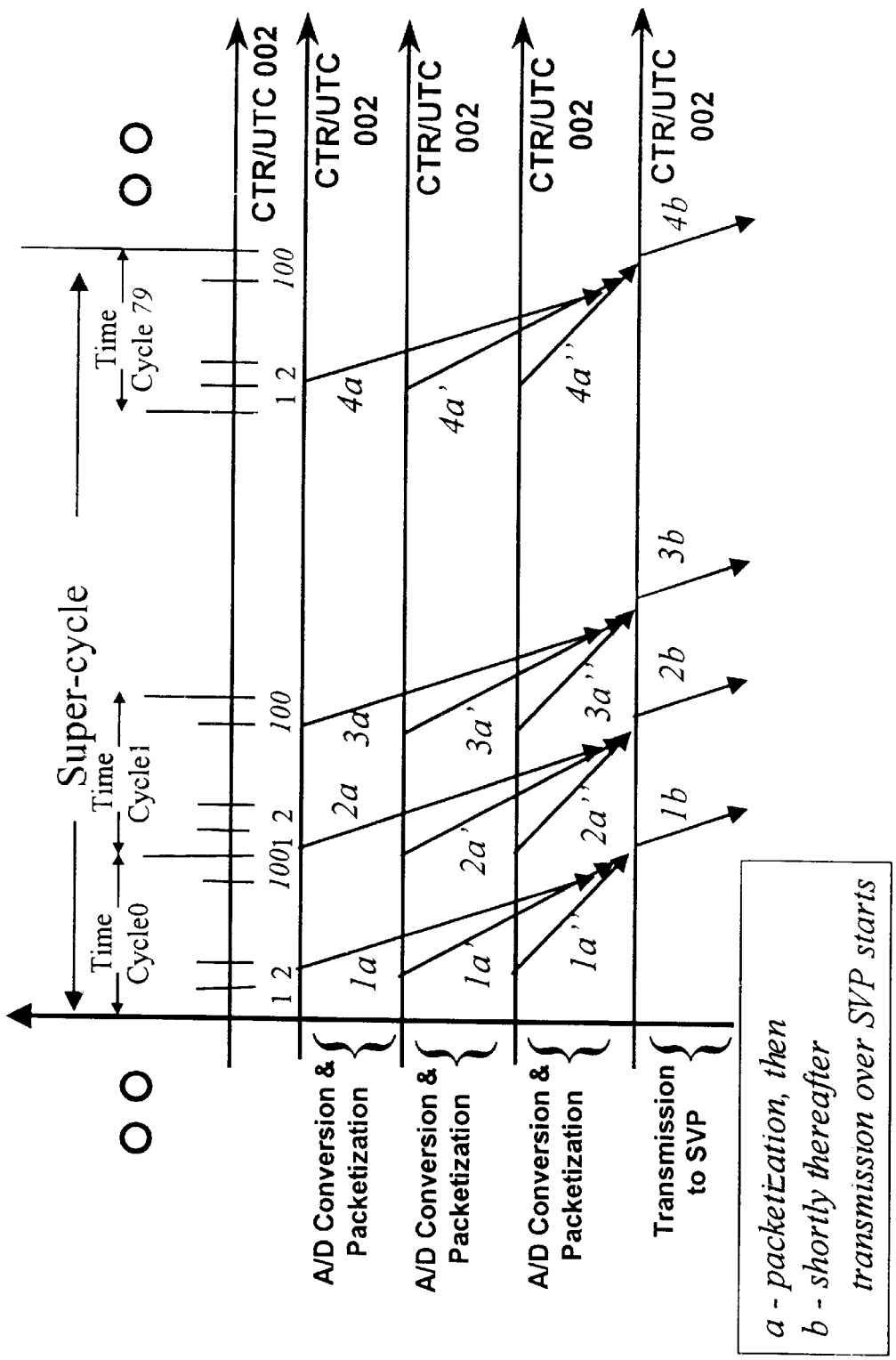
FIG. 16 Packetization & transmission while multiplexing multiple calls in one packet

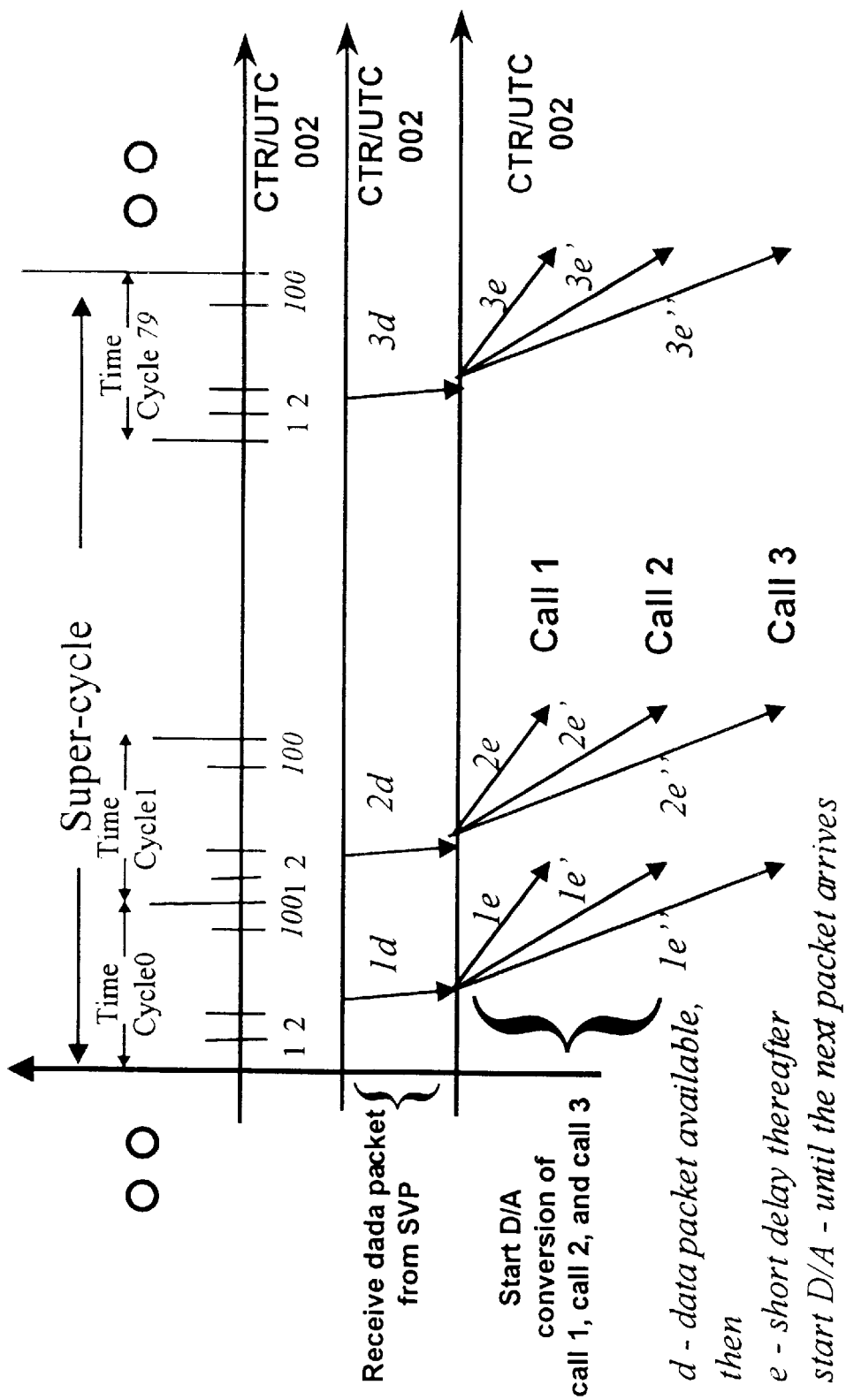
FIG. 17 Receiving data packets, depacketization, demultiplexing of multiple of multiple phone calls, then D/A (digital-to-analog) conversion

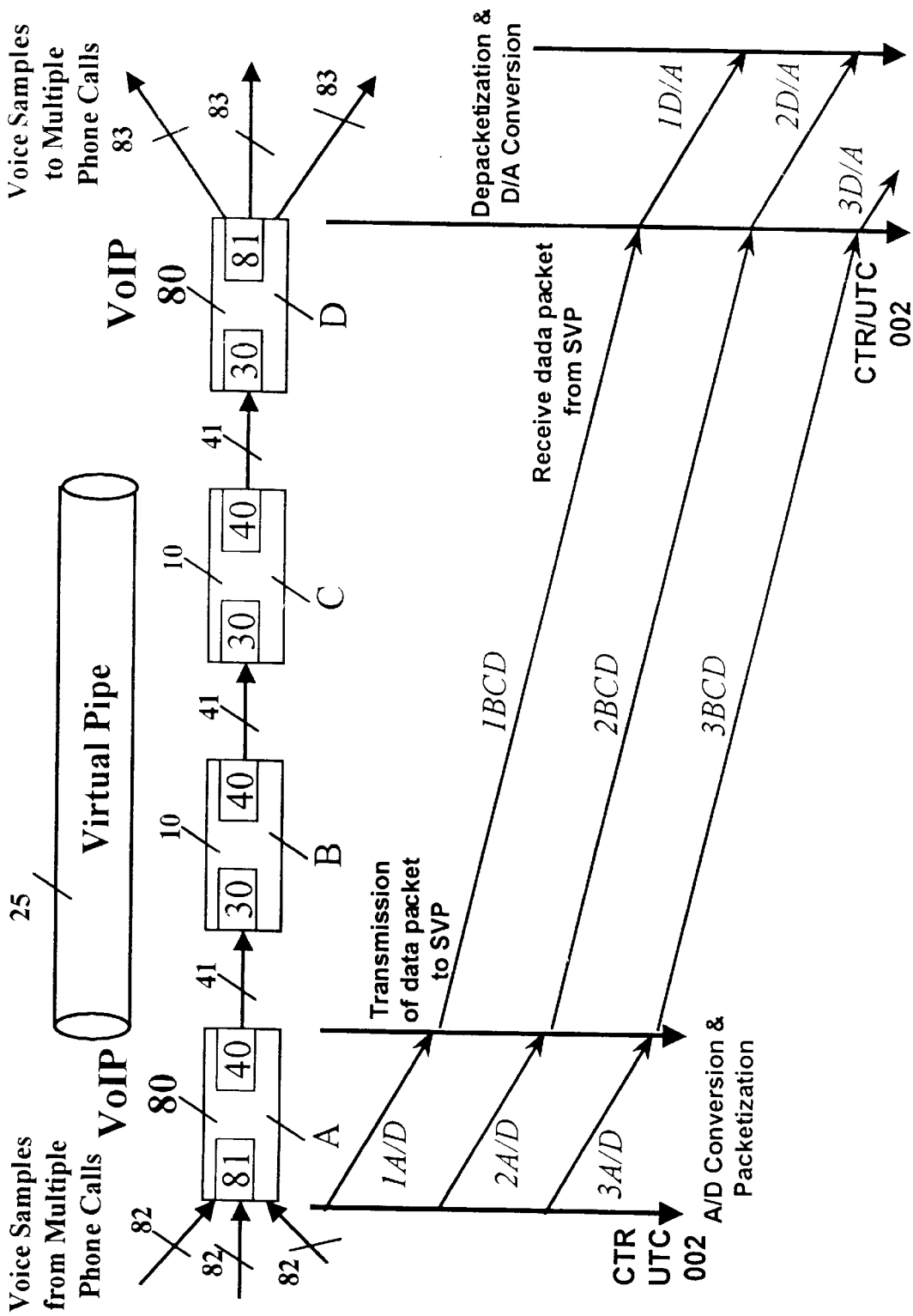
FIG. 18 VoIP-to-SVP-to-VoIP synchronization

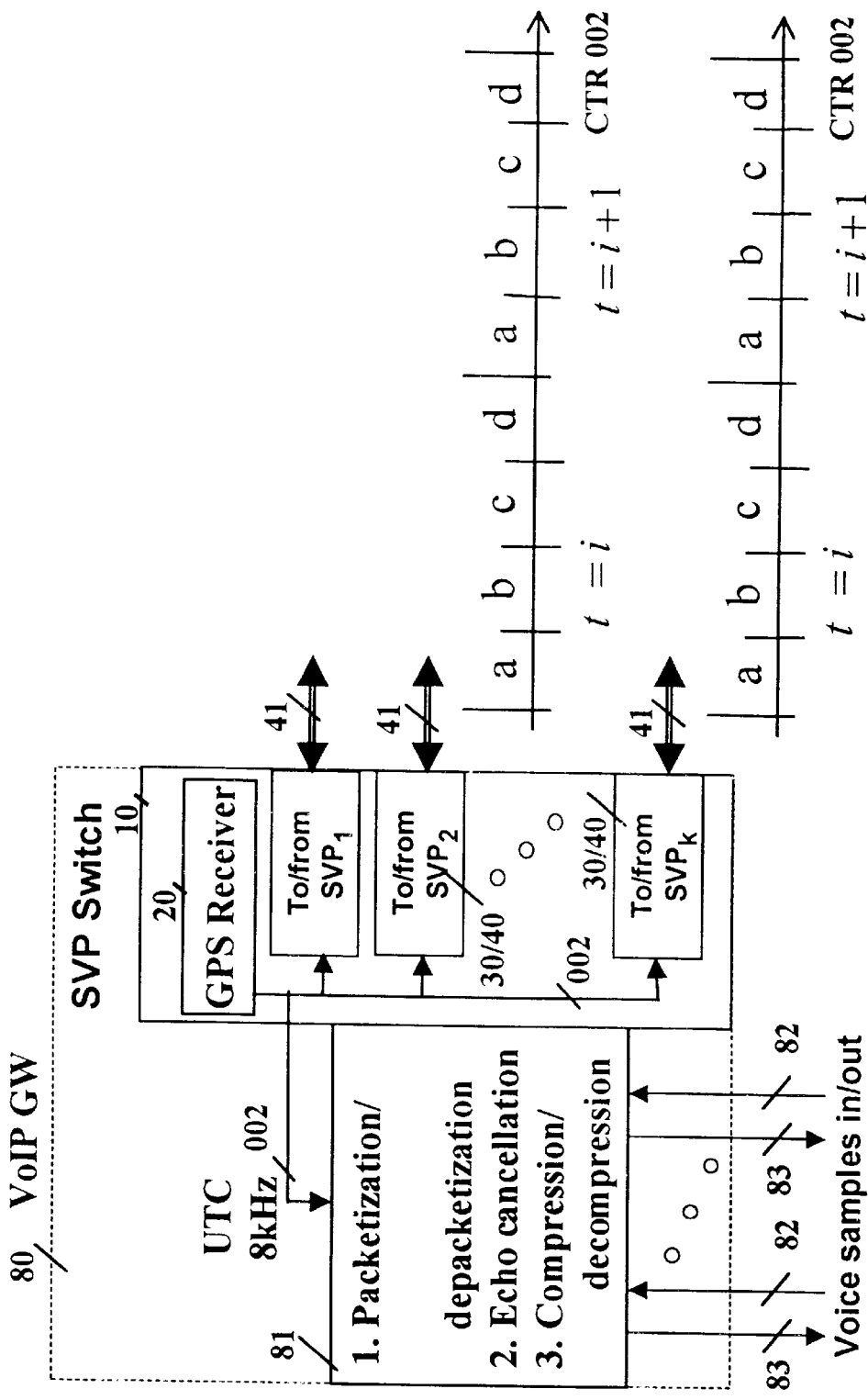
FIG. 19  In time frame call multiplexing without headers and with time-based routing

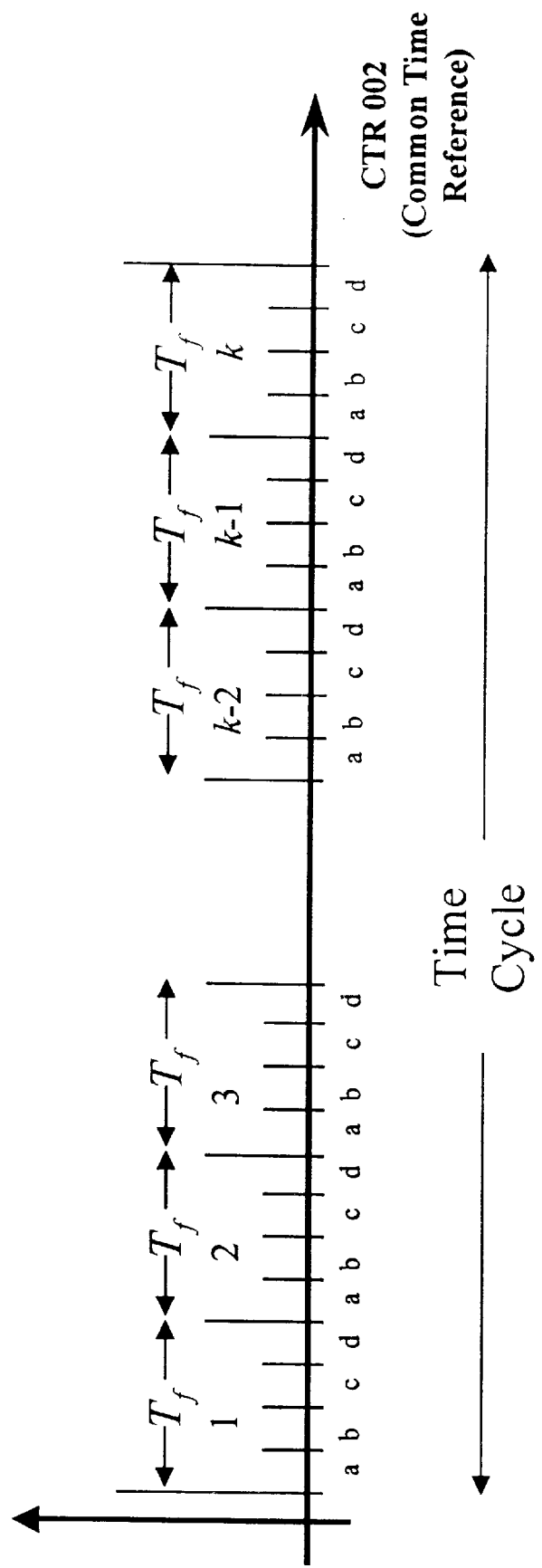
FIG. 20 (see 5 of patent #2)

A replica of the possible echo signal is stored at the transmitting end and is subtracted from the incoming signal with the correct magnitude. The magnitude is determined from the incoming signal from the far-end

Assuming that the first N components of the transmitted signal are significant:

EQ. 2 - $d(k) = y(k) + \sum_{n=1}^{N} \{h(n) - h'(n)[k]\} \, x(k-n)$ $k$ - signal received time
$d(k)$ - signal resulting after echo cancellation
$r(k)$ - received signal
$e(k)$ - echo signal sampled at time $k$
$e'(k)$ - estimated echo signal sampled at time $k$
$y(k)$ - component of received signal due to transmission from the other side
$x(k-n)$ - transmitted signal transmitted at time $k-n$
$h(n)$ - weighted factor for signal delayed by a time $n$

PACKET TELEPHONE SCHEDULING WITH COMMON TIME REFERENCE

RELATED APPLICATIONS

This application is a continuation of patent application Ser. No. 09/120,636, filed Jul. 22, 1998, which is a continuation of provisional application Ser. No. 60/088,983 filed Jun. 11, 1998.

FEDERALLY SPONSORED RESEARCH OR DEVELOPMENT

Not Applicable.

BACKGROUND OF THE INVENTION

This invention relates to generally to a method and apparatus for transmitting of data on a communications network. More specifically, this invention relates to timely forwarding and delivery of data packets over the network to Voice over Internet Protocol (VoIP) gateways (see for example: [M. Hamdi, O. Verscheure, J-P Hubaux, I. Dalgic, and P. Wang, Voice Service Interworking and IP Networks, IEEE Communications Magazine, May 1999, pp. 104–111]). Consequently, between anytwo VoIP gateways the end-to-end performance parameters, such as, loss, delay and jitter, have deterministic guarantees.

The proliferation of high-speed communications links, fast processors, and affordable, multimedia-ready personal computers brings about the need for wide area networks that can carry streaming of real-time data packets, from various circuit switched telephony network sources (e.g., analog telephones, ISDN telephones, T1 lines, T3 lines, etc.—see for example: [W. Stallings, *ISDN: An Introduction*, MacMillan Publishing Company, 1989]). However, the end-to-end transport requirements of real time multimedia applications present a major challenge that cannot be solved satisfactorily by current networking technologies. Such applications as video teleconferencing, and audio and video group (many-to-many) multicasting generate data at a wide range of bit rates and require predictable, stable performance and strict limits on loss rates, end-to-end delay bounds, and delay variations (also known as "jitter"). These characteristics and performance requirements are incompatible with the services that current circuit and packet switching networks can offer.

Circuit-switched networks, which are still the main carrier of streams of real-time traffic, are designed for telephony service and cannot be easily enhanced to support multiple services or carry multimedia traffic. Its synchronous byte switching enables circuitswitching networks to transport data streams at constant rates with little delay or jitter. However, since circuit-switching networks allocate resources exclusively for individual connections, they suffer from low utilization under bursty traffic. Moreover, it is difficult to dynamically allocate circuits of widely different capacities, which makes it a challenge to support multimedia traffic. Finally, the synchronous byte switching of Synchronous Optical NETwork (SONET) or Synchronous Digital Hierarchy (SDH), requires increasingly more precise clock synchronization as the lines speed increases [John C. Bellamy, Digital Network Synchronization, IEEE Communications Magazine, April 1995, pp. 70–83].

Packet switching networks like IP (Internet Protocol)-based Internet and Intranets [see, for example, A. Tannebaum, *Computer Networks* (3rd Ed) Prentice Hall, 1996] and ATM (Asynchronous Transfer Mode) [see, for example, Handel et al., *ATM Networks: Concepts, Protocols, and Applications*, (2nd Ed.) Addison-Wesley, 1994] handle bursty data more efficiently than circuit switching, due to their statistical multiplexing of the packet streams. However, current packet switches and routers operate asynchronously and provide "best effort" service only, in which end-to-end delay and jitter are neither guaranteed nor bounded. Furthermore, statistical variations of traffic intensity often lead to congestion that results in excessive delays and loss of packets, thereby significantly reducing the fidelity of real-time streams at their points of reception.

Efforts to define advanced services for both IP and ATM networks have been conducted in two levels: (1) definition of service, and (2) specification of methods for providing different services to different packet stra& The former defines interfaces, data formats, and performance objectives. The latter specifies procedures for processing packets by hosts and switches/routers. The types of services that defined for ATM include constant bit rate (CBR), variable bit rate (VBR) and available bit rate (ABR).

The methods for providing different services under packet switching fall under the general title of Quality of Service (QoS). Prior art in QoS can be divided into two parts: (1) traffic shaping with local timing without deadline scheduling, for example [Demers et al., Analysis and Simulation Of A Fair Queuing Algorithm, ACM Computer Communication Review (SIGCOMM'89), pp. 3–12, 1989; S. J. Golestani, Congestion Free Communication In High-Speed Packet Networks, IEEE Transcripts on Communications, COM–39(12): 1802–1812, December 1991; Parekh et al.,A Generalized Processor Sharing Approach To Flow Control-The Multiple Node Case, IEEM/ACM T. on Networking, 2(2): 137–150, 1994], and (2) traffic shaping with deadline scheduling, for example [Ferrari et al., A Scheme For Real-Time Channel Establishment In Wide Area Networks, IEEE Journal on Selected Areas in Communication, SAC-8(4): 368–379, April 1990]. Both of these approaches rely on manipulation of local queues by each router with little or no coordination with other routers. These approaches have inherent limitations when used to transport real-time streams. When traffic shaping without deadline scheduling is configured to operate at high utilization with no loss, the delay and jitter are inversely proportional to the connection bandwidth, which means that low rate connections may experience large delay and jitter inside the network. In traffic shaping with deadline scheduling the delay and jitter are controlled at the expense of possible congestion and loss.

The real-time transport protocol (RTP) [H. Schultzrinne et. al, RTP: A Transport Protocolfor Real-Time Applications, IBEF Request for Comment RFC1889, January 1996] is a method for encapsulating time-sensitive data packets and attaching to the data time related information like time stamps and packet sequence number. RTP is currently the accepted method for transporting real time streams over IP internetworks and packet audio/video telephony based on IIU-T H.323.

One approach to an optical network that uses synchronization was introduced in the synchronous optical hypergraph [Y. Ofek, The Topology, Algofithms And Analysis Of A Synchronous Optical Hypergraph Architecture, Ph.D. Dissertation, Electrical Engineering Department, University of illinois at Urbana, Report No. UIUCDCS-R-87 1343, May 1987], which also relates to how to integrate packet telephony using synchronization [Y.

Ofek, Integration Of Voice Communication On A Synchronous Optical Hypergraph, INFOCOM'88, 1988]. In the synchronous optical hypergraph, the forwarding is performed over hyper-edges, which are passive optical stars. In [Li et al., Pseudo-Isochronous Cell Switching In ATM Networks, IEEE INFOCOM'94, pp. 428–437, 1994; Li et al., TimeDriven Priority: Flow Control For Real-Time Heterogeneous Internetworkig, IEEE INFOCOM'96, 1996] the synchronous optical hypergraph idea was applied to networks with an arbitrary topology and with point-to point links. The two papers [Li et al., PseudIsochronous Cell Switching InATMNetworks, IEEE JNFOCOM'94, pages 428–437, 1994; Li et al., Time-Driven Priority: Flow Control For Real-Time Heterogeneous Internetworking, IEE INFOCOM'96, 1996] provide an abstract (high level) description of what is called "RISC-like forwarding", in which a packet is forwarded, with little if any details, one hop every time frame in a manner similar to the execution of instructions in a Reduced Instruction Set Computer (RISC) machine.

SUMMARY OF THE INVENTION

In accordance with the present invention, a method is disclosed providing virtual pipes that carry streams of real-time traffic to/from Voice over Internet Protocol (VoIP) gateways over packet switching networks with timely forwarding and delivery. Consequently, between any two VoIP gateways the performance parameters, such as, loss, delay and jitter, have deterministic guarantees. The method combines the advantages of both circuit and packet switching. It provides for allocation for the exclusive use of predefined connections and for those connections it guarantees loss free transport with low delay and jitter. When predefined connections do not use their allocated resources, other non-reserved data packets can use them without affecting the performance of the predefined connections.

Under the aforementioned prior art methods for providing packet switching services, switches and routers operate asynchronously. The present invention provides real-time services by synchronous methods that utilize a time reference that is common to the switches and end stations comprising a wide area network. The common time reference can be realized by using UTC (Coordinated Universal Time), which is globally available via, for example, GPS (Global Positioning System—see, for example: [Peter H. Dana, Global Positioning System (GPS) Time Dissemination for Real-Time Applications, Real-Time Systems, 12, pp. 9–40, 1997]. By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http: //www.boulder.nist.gov/timefreq) is responsible for coordinating UTC with the International Bureau of Weights and Measures (BIPM) in Paris.

UTC timing is readily available to individual PCs through GPS cards. For example, TrueTime, Inc. (Santa Rosa, Calif.) offers a product under the tradename PCI-SG which provides precise time, with zero latency, to computers that have PCI extension slots.

Another way by which UTC can be provided over a network is by using the Network Time Protocol (NIP) [D. Mills, Network Time Protocol (version 3) IETF RFC 1305].

However, the clock accuracy of NTP is not adequate for inter-switch coordination, on which this invention is based.

In accordance with the present invention, the synchronization requirements are independent of the physical link transmission speed, while in circuit switching the synchronization becomes more and more difficult as the link speed increases.

In accordance with the present invention, timing information is not used for routing, and therefore, in the Internet, for example, the routing is done using IP addresses or an IP tag/label.

These and other aspects and attributes of the present invention will be discussed with reference to the following drawings and accompanying specification.

BRIEFS DESCRIPTION OF THE DRAWINGS

FIG. 1 is a schematic block diagram of a VoIP gateway of the present invention;

FIG. 2 is a timing diagram of a common time reference (CTR) that is aligned to UTC as utilized by the present invention;

FIG. 3 is a schematic block diagram of a virtal pipe and its timing relationship with a common time reference (CTR) as in the present invention;

FIG. 4 illustrates the mapping of the time flames into and out of a node on a virtual pipe of the present invention;

FIG. 5B is a table illustrating a 4B/5B encoding scheme for data;

FIG. 5C is a table illustrating a 4B/5B encoding scheme for control signals;

FIG. 6A is an map of a data packet with a header as utilized in the present invention;

Figure 21:
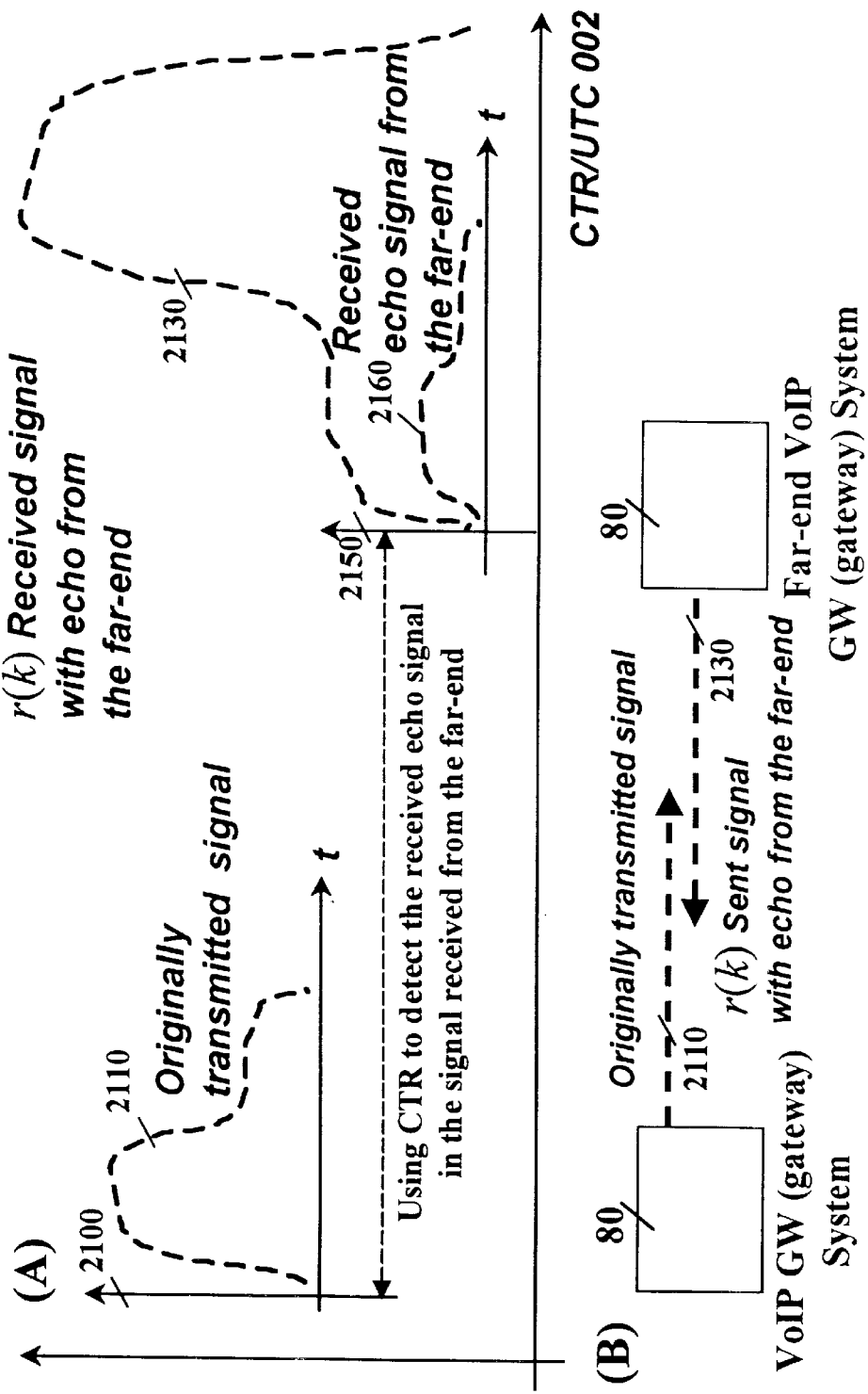

FIG. 6B maps additional detail of the encoding in FIG. 6A;

FIG. 7 is a schematic block diagram of an input port of the present invention;

FIG. 8 is a flow diagram describing the operation of the routing controller of the present invention;

FIG. 9 is a schematic block diagram of an output port of the present invention;

FIG. 10 is a schematic block diagram of the output port general scheduling controller of the present invention;

FIG. 11 is a flow diagram describing the operation of the packet scheduling controller of FIG. 10;

FIG. 12 is a flow diagram describing the operation of the select buffer controller of FIG. 10;

FIG. 13 is a schematic block diagram of a synchronous virtual pipe interface to a VoIP gateway as provided by the present invention;

FIG. 14 is a timing diagram illustrating processing, assembling of packets of digital samples, and on-time transmission of the data packets of the present invention;

FIG. 15 is a timing diagram illustrating the receipt, separation of samples from the packet, and other processing of packets of data of the present invention;

FIG. 16 is a timing diagram illustrating multiplexing of multiple streams or calls into one data packet in the present invention;

FIG. 17 is a timing diagram illustrating demultiplexing of data packets into multiple streams or calls in the present invention;

FIG. 18 illustrates both a schematic block diagram of an end-to-end VoIP connection and a timing diagram illustrating the timing of same schematic block diagram providing synchronized VoIP operation as in the present invention;

FIG. 19 is a schematic block diagram of time frame call multiplexing using headerless time-based routing of the present invention;

FIG. 20 is a timing diagram of the headerless time-based routing of the present invention;

FIG. 21A is a composite amplitude versus time diagram of echo cancellation using CTR/UTC as in the present invention;

FIG. 21B is a functional description of the echo cancellation of the present invention with two VoIP gateway systems; and FIG. 22 is a description of the formulations used for echo cancellation in the present invention.

DETAILED DESCRIPTION OF THE PREFERRED EMBODIMENT

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The present invention relates to a system and method for transmitting and forwarding packets over a packet switching network The switches of the network maintain a common time reference, which is obtained either from an external source (such as GPS—Global Positioning System) or is generated and distributed internally. The common time reference is used to define time intervals, which include time super-cycles, time cycles, time frames, time slots, and other kinds of time intervals. The time intervals are arranged both in simple periodicity and complex periodicity like seconds and minutes of a clock).

A packet that arrives to an input port of a switch, is switched to an output port based on specific routing information in the packet's header (e.g., WPv4 destination address in the Internet, VCI/VPI labels in ATM). Each switch along a route from a source to a destination forwards packets in periodic time intervals that are predefined using the common time reference.

A time interval duration can be longer than the time duration required for communicating a packet, in which case the exact position of a packet in the time interval is not predetermined. A packet is defined to be located within the time interval which contains the communication of the first bit of the packet, even if the length of the packet is sufficiently long to require multiple time intervals to communicate the entire packet Packets that are forwarded inside the network over the same route and in the same periodic time intervals constitute a virtual pipe and share the same pipe-ID. A pipe-ID can be either explicit, such as a tag or a label that is generated inside the network, or implicit such as a group of IP addresses. A virtual pipe can be used to transport data packets from multiple sources and to multiple destinations. The time interval in which a switch forwards a specific packet is determined by the packet's pipe-ID, the time it reaches the switch, and the current value of the common time reference.

A virtual pipe provides deterministic quality of service guarantees. In accordance with the present invention, congestion-free packet switching is provided for pipe-IDs in which capacity in their corresponding forwarding links and time intervals is reserved in advance. Furthermore, packets that are transferred over a virtual pipe reach their destination in predefined time intervals, which guarantees that the delay jitter is smaller than or equal to one time interval.

Packets that are forwarded from one source to multiple destinations share the same PID and the links and time intervals on which they are forwarded comprise a virtual tree. This facilitates congestion-free forwarding from one input port to multiple output ports, and consequently, from one source to multiplicity of destinations. Packets that are destined to multiple destinations reach all of their destinations in predefined time intervals and with delay jitter that is no larger than one time interval.

A system is provided for managing data transfer of data packets from a source to a destination. The transfer of the data packets is provided during a predefined time interval, comprised of a plurality of predefined time frames. The system is further comprised of a plurality of switches. A virtual pipe is comprised of at least two of the switches interconnected via communication links in a path. A common time reference signal is coupled to each of the switches, and a time assignment controller assigns selected predefined time frames for transfer into and out from each of the respective switches responsive to the common time reference signal. Each communications link may use a different time frame duration generated from the common time reference signal.

For each switch, there is a first predefined time frame within which a respective data packet is transferred into the respective switch, and a second predefined time frame within which the respective data packet is forwarded out of the respective switch, wherein the first and second predefined time frames may have different durations and wherein both the first and second predefined time frames are. The time assignment provides consistent fixed intervals between the time between the input to and output from the virtual pipe.

In a preferred embodiment, there is a predefined subset of the predefined time frames during which the data packets are transferred in the switch, and for each of the respective switches, there are a predefined subset of the predefined time frames during which the data packets are transferred out of the switch.

Each of the switches is comprised of one or a plurality of addressable input and output ports. A routing controller maps each of the data packets that arrives at each one of the input ports of the respective switch to a respective one or more of the output ports of the respective switch.

For each of the data packets, there is an associated time of arrival to a respective one of the input ports. The time of arrival is associated with a particular one of the predefined time frames. For each of the mappings by the routing controller, there is an associated mapping by a scheduling controller, which maps of each of the data packets between the time of arrival and forwarding time out The forwarding time out is associated with a specified predefined time frame.

In the preferred embodiment, there are a plurality of the virtual pipes comprised of at least two of the switches interconnected via communication licks in a path. The communication link is a connection between two adjacent switches; and each of the communications links can be used simultaneously by at least two of the virtual pipes. Multiple data packets can be transferred utilizing at least two of the virtual pipes.

In some configurations of this invention there is a fixed time difference, which is constant for all switches, between the time frames for the associated time of arrival and forwarding time out for each of the data packets. The fixed time difference is a variable time difference for some of the switches. A predefined interval is comprised of a fixed number of contiguous time frames comprising a time cycle. Data packets that are forwarded over a given virtual pipe are forwarded from an output port within a predefined subset of time frames in each time cycle. Furthermore, the number of data packets that can be forwarded in each of the predefined subset of time frames for a given virtual pipe is also predefined.

The time frames associated with a particular one of the switches within the virtual pipe are associated with the same switch for all the time cycles, and are also associated with one of input into or output from the particular repective switch.

In some configurations of this invention there is a constant fixed time between the input into and output from a respective one of the switches for each of the time frames within each of the time cycles. A fixed number of contiguous time cycles comprise a super-cycle, which is periodic. Data packets that are forwarded over a given virtual pipe are forwarded from an output port within a predefined subset of time frames in each super-cycle. Furthermore, the number of data packets that can be forwarded in each of the predefined subset of time frames within a super-cycle for a given virtual pipe is also predefined.

In the preferred embodiment the common time reference signal is coupled from a GPS (Global Positioning System), and is in accordance with the UTC (Coordinated Universal Time) standard. The UTC time signal does not have to be received directly from GPS. Such signal can be received by using various means, as long as the delay or time uncertainty associated with that UTC time signal does not exceed half a time frame.

In one embodiment, the supercycle duration is equal to one second as measured using the UTC (Coordinated Universal Time) standard. In an alternate embodiment the super-cycle duration spans multiple UTC seconds. In another alternate embodiment the super-cycle duration is a fraction of a ATC second. In the most preferred embodiment, the super-cycle duration is a small integer number of UTC seconds.

A select buffer controller maps one of the time frames for output from a first switch to a second time frame for input via the communications link to a second switch. The select buffer controller uses the UTC time signal in order to identify the boundaries between two successive time frames. The select buffer controller inserts a time frame delimiter (IFD) signal into the transmission link in order to the signal the second switch with the exact boundary between two time frames.

Each of the data packets is encoded as a stream of data, and a time frame delimiter is inserted into the stream of data responsive to the select buffer controller. This can be implemented by using a redundant serial codeword as it is later explained.

The communication links can be of fiber optic, copper, and wireless communication links for example, between a ground station and a satellite, and between two satellites orbiting the earth The communication link between two nodes does not have to be a serial communication link A parallel communication link can be used—such a link can simultaneously carry multiple data bits, associated clock signal, and associated control signals.

The data packets can be Internet protocol (IP) data packets, and asynchronous transfer mode (ATM) cells, and can be forwarded over the same virtual pipe having an associated pipe identification (PID). The PID can be an Internet protocol (IP) address, Internet protocol group multicast address, an asynchronous transfer mode (ATM), a virtual circuit identifier (VCI), and a virtual path identifier (VPI), or (used in combination as VCI/VPI).

The routing controller determines two possible associations of an incoming data packet: (i) the output port, and (ii) the time of arrival (ToA). The ToA is then used by the scheduling controller for determining when a data packet should be forwarded by the select buffer controller to the next switch in the virtal pipe. The routing controller utilizes at least one of Internet protocol version 4 (IPv4), Internet protocol version 6 (IPv6) addresses, Internet protocol group multiast address, Internet MPLS (multi protocol label swapping or tag switching) labels, ATM virtual circuit identifier and virtual path identifier (VCI/VPI), and IEEE 802 MAC (media access control) addresses, for mapping from an input port to an output port.

Each of the data packets is comprised of a header, which includes an associated time stamp. For each of the mappings by the routing controller, there is an associated mapping by the scheduling controller, of each of the data packets between the respective associated time-stamp and an associated forwarding time out, which is associated with one of the predefined time frames. The time stamp can record the time in which a packet was created by its application.

In one embodiment the time-stamp is generated by an Internet real-time protocol (RTP), and by a predefined one of the switches. The time-stamp can be used by a scheduling controller in order to determine the forwarding time of a data packet from an output port.

Each of the data packets originates from an end station, and the time-stamp is generated at the respective end station for inclusion in the respective originated data packet. Such generation of a time-stamp can be derived from UVIC either by receiving it directly from GPS or by using the Internet's Network Time Protocol (NTP). The time stamp can alternatively be generated at the PT sub-network boundary, which is the point at which the data enters the synchronous virtual pipe.

In accordance with the present invention, a system is provided for transferring data packets across a data network while maintaining for reserved data traffic constant bounded jitter (or delay uncertainty) and no congestion-induced loss of data packets. Such properties are essential for many multimedia applications, such as, telephony and video teleconferencing.

In accordance with the design, method, and illustrated implementation of the present invention, one or a plurality of virtual pipes are provided over a data network with general topology. Such data network can span the globe.

FIG. 3 is a schematic illustration of a virtual pipe and its timing relationship with a common time reference (CTR), wherein delay is determined by the number of time frames between the forward time out at Node A and the forward time out at Node D. Each virtual pipe 25 is constructed over one or more switches 10 which are interconnected via communication links 41 in a path.

FIG. 3 illustrates a virtual pipe 25 from the output port 40 of switch A, through switches B and C. The illustrated virtual pipe ends at the output port 40 of node D. The virtual pipe 25 transfers data packets from at least one source to at least one destination.

The data packet transfers over the virtal pipe 25 via switches 10 are designed to occur during a plurality of predefined time intervals, wherein each of the predefined time intervals is comprised of a plurality of predefined time frames. The timely transfers of data packets are achieved by coupling a common time reference signal (not shown) to each of the switches 10.

FIG. 1 is a schematic description VoIP gateway (GW) with streaming of digital samples in which the following functions are performed in its packeting subsystem controller 81: (1) packetization (assembly of digital samples into data packets) and depacketization (separation of digital samples from data packets), (2) echo cancellation, and (3) compression and decompression. The controller 81 is constructed of a central processing unit (CPU), a random access memory (RAM) for storing the data packets and digital samples, a read only memory (ROM) for storing the controller processing program, and a table with forwarding and operation parameters. The packeting subsystem controller 81 is coupled to a synchronous virtual pipe (SVP) switch 10. The controller 81 is also coupled via digital sample input links 82 and digital sample output links 83 to external voice, video, and other devices (not shown).

The SVP switch 10 of FIG. 1 is also coupled to one or more synchronous virtual pipes 41 by way of combination input/output ports 30/40. The synchronous virtual pipes 41 can be implemented within an IP network.

The SVP switch 10 of FIG. 1 is further comprised of a GPS receiver 20 linked via a common time reference (CTR) signal 002 to each of the input/output ports 30/40. In this manner, a common time reference is supplied to each of the input ports and each of the output ports within the SVP switch 10. The CmR signal 002 is also coupled to the controller 81 as shown in the figure.

FIG. 13 is a schematic block diagram of a synchronous virtual pipe interface to a VoIP gateway as provided by the present invention, illustrating detail of an alternate embodiment. In this embodiment, the SVP switch 10 additionally comprises a switching fabric 50 which is coupled to one or more input ports 30 and one or more output ports 40. Each of the input ports 30 is coupled to the switch fabric 50 via links 37, as shown in FIG. 7. Each of the output ports 40 is coupled to the switch fabric 50 via links 51 as shown in FIG. 9. The switch fabric is inherently coupled and integrated (not shown) to the controller 81. Each pair of respective input port 30 and output port 40 comprise an inputoutput port 30/40. As shown in FIG. 13, the common time reference (CTR) signal 002 is coupled to each input port 30, each output port 40, and to the controller 81. The controller 81 is also coupled via digital sample input links 82 and digital sample output links 83 to external voice devices (not shown).

FIG. 2 is an illustration of a common time reference (CTR) that is aligned to UTC. Consecutive time frames are grouped into time cycles. As shown in the example illustrated in FIG. 2, there are 100 time frames in each time cycle. For illustration purposes, the time frames within a time cycle are numbered 1 through 100.

Consecutive time cycles are grouped together into super-cycles, and as shown in FIG. 2, there are 80 time cycles in each super-cycle. For illustration purposes, time cycles within a super-cycle are numbered 0 through 79. Super-cycles 0 and m are shown in FIG. 2.

FIG. 2 is illustrative of the relationship of time frames, time cycles, and super-cycles; in alternate embodiments, the number of time frames within a time cycle may be different than 100, and the number of time cycles within a super-cycle may be different than 80.

FIG. 2 illustrates how the common time reference signal can be aligned with the UTC (Coordinated Universal Time) standard. In this illustrated example, the duration of every super-cycle is exactly one second as measured by the UTC standard. Moreover, as shown in FIG. 2 the beginning of each super-cycle coincides with the beginning of a UTC second. Consequently, when leap seconds are inserted or deleted for IYIC corrections (due to changes in the earth rotation period) the cycle and super-cycle periodic scheduling will not be affected. The time frames, time cycles, and super-cycles are associated in the same manner with all respective switches within the virtual pipe at all times.

In the embodiment illustrated in FIG. 2, the super-cycle duration is equal to one second as measured using the UTC (Coordinated Universal Time) standard. In an alternate embodiment the super-cycle duration spans multiple UTC seconds. In another alternate embodiment the super-cycle duration is a fraction of a UTC second. In the most preferred embodiment, the super-cycle duration is a small integer number of UTC seconds.

Pipeline forwarding relates to data packets being forwarded across a virtual pipe 25 with a predfined delay in every stage (either across a communication link 41 or across a switch 10 from input port 30 to output port 40). Data packets enter a virtual pipe 25 from one or more sources and are forwarded to one or more destinations.

Referring to FIG. 3, the timely pipeline forwarding of data packets over the virtual pipe 25 is illustrated. In this figure, time cycles each contain 10 time frames, and for clarity the super-cycles are not shown. A data packet is received by one of the input ports 30 of switch A at time frame 1, and is forwarded along this virtual pipe 25 in the following manner: (i) the data packet 41A is forwarded from the output port 40 of switch A at time frame 2 of time cycle 1, (ii) the data packet 41B is forwarded from the output port 40 of switch B, after 18 time frames, at time frame 10 of time cycle 2, (iii) the data packet 41C is forwarded from the output port 40 of switch C, after 42 time frames, at time frame 2 of time cycle 7, and (iv) the data packet 41D is forwarded from the output port 40 of switch D, after 19 time frames, at time frame 1 of time cycle 9.

As illustrated in FIG. 3,

All data packets enter the virtual pipe 25 (i.e., forwarded out of the output port 40 of switch A) periodically at the second time frame of a time cycle, are output from this virtual pipe 25 (i.e., are forwarded out of the output port 40 of switch D) after 79 time frames.

The data packets that enter the virtual pipe 25 (i.e., forwarded out of the output port 40 of switch A) can come from one or more sources and can reach switch A over one or more input links 41.

The data packets that exit the virtual pipe 25 (i.e., forwarded out of the output port 40 of switch D) can be forwarded over plurality of output links 41 to one of plurality of destinations.

The data packets that exit the virtual pipe 25 (i.e., forwarded out of the output port 40 of switch D) can be forwarded simultaneously to multiple destinations, (i.e., multi-cast (one-to-many) data packet forwarding).

The communication link 41 between two adjacent ones of the switches 10 can be used simultaneously by at least two of the virtual pipes.

A plurality of virtual pipes can multiplex (ie., mix their traffic) over the same communication links A plurality of virtual pipes can multiplex (i.e., mix their traffic) during the same time frames and in an arbitrary manner.

The same time frame can be used by multiple data packets from one or more virtual pipes.

For each virtual pipe there are predefined time frames within which respective data packets are transferred into its respective switches, and separate predefined time frames within which the respective data packets are transferred out of its respective switches. Though the time frames of each virtual pipe on each of its switches can be assigned in an arbitrary manner along the common time reference, it is convenient and practical to assign time frames in a periodic manner in time cycles and super-cycles.

The switch 10 structure, as shown in FIG. 3, can also be referred to as a pipeline switch, since it enables a network comprised of such switches to operate as a large distributed pipeline architecture, as it is commonly found inside digital systems and computer architectures.

FIG. 4 illustrates the mapping of the time frames into and out of a node on a virtual pipe, wherein the mapping repeats itself in every time cycle illustrating the time in, which is the time of arrival (ToA), versus the time out, which is the forwarding time out of the output port. FIG. 4 thereby the periodic scheduling and forwarding timing of a switch of a virtual pipe wherein there are a predefined subset of time frames (i, 75, and 80) of every time cycle, during which data packets are transferred into that switch, and wherein for that virtual pipe there are a predefined subset time frames (i+3, 1, and 3) of every time cycle, during which the data packets are transferred out of that switch In the illustrated example of FIG. 4, a first data packet 5*a* arriving at the input port of the switch at time frame i is forwarded out of the output port of the switch at time frame i+3. In this example the data packet is forwarded out of the output port at a later time frame within the same time cycle in which it arrived. The delay in transiting the switch dts determines a lower bound on the value (i+dts). In the illustrated example, dts must be less than or equal to 3.

Also as shown in FIG. 4, a second data packet 5*b* arriving at the input port of the switch at time frame 75 is forwarded out of the output port of the switch at time frame 1 within the next time cycle. In this example the data packet is forwarded out of the output port at a earlier numbered time frame but within the next time cycle from which it arrived. Note that data packets in transit may cross time cycle boundaries.

If—for example—each of the three data packets has 125 bytes (i.e. 1000 bits), and there are 80 time frames of 125 microseconds in each time cycle (i.e. a time cycle duration of 10 miliseconds), then the bandwidth allocated to this virtual pipe is 300,000 bits per second. In general, the bandwidth or capacity allocated for a virtual pipe is computed by dividing the number of bits transferred during each of the time cycles by the time cycle duration. In the case of a bandwidth in a super-cycle, the bandwidth allocated to a virtual pipe is computed by dividing the number of bits transferred during each of the super-cycles by the super-cycle duration.

Each pipeline switch 10 is comprised of a plurality of addressable input ports 30 and output ports 40. As illustrated in FIG. 7, the input port 30 is further comprised of a routing controller 35B for mapping each of the data packets that arrives at each one of the input ports to a respective one of the queue to the output ports. As illustrated in FIG. 9, the output port 40 is further comprised of a scheduling controller and transmit buffer 45.

Figure 5A:
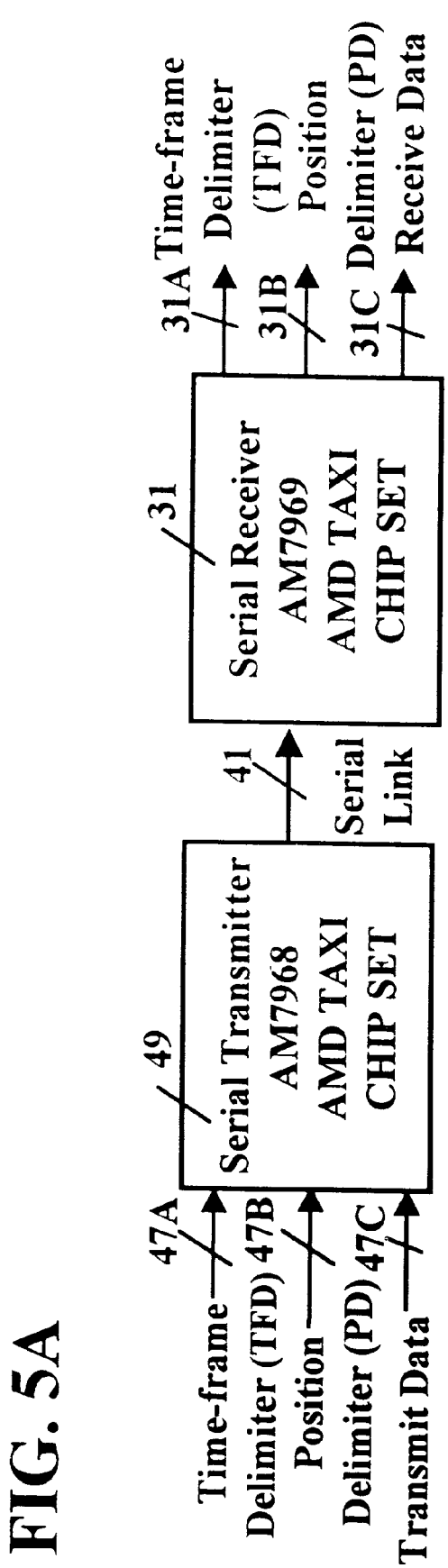
FIG. 5A is an schematic block diagram of a serial transmitter and a serial receiver connected as in the present invention.

An output port 40 is connected to a next input port 30 via a communication link 41, as shown in FIGS 3 and 5A The communication link can be realized using various technologies compatible with the present invention including fiber optic conduits, copper and other wired conductors, and wireless communication link—sincluding but not limited to, for example, radio frequency (RF) between two ground stations, a ground station and a satellite, and between two satellites orbiting the earth, microwave links, infrared (IR) links, optical communications lasers. The communication link does not have to be a serial communication link A parallel communication link can be used—such a parallel link can simultaneously carry multiple data bits, associated clock signals, and associated control signals.

As shown in FIG. 1, the common time reference 002 is provided to the input ports 30 and output ports 40 (comprising the inputloutput ports 30/40) from the GPS time receiver 20, which receives its timing signal from the GPS antenna 001. GPS time receivers are available from variety of manufacturers, such as, TrueTime, Inc. (Santa Rosa, Calif.). With such equipment, it is possible to maintain a local clock with accuracy of ±1 microsecond from the UTC (Coordinated Universal Time) standard everywhere around the globe.

FIG. 5A is an illustration of a serial transmitter and a serial receiver. FIG. 5B is a table illustrating the 4B/5B encoding scheme for data, and FIG. 5C is a table illustrating the 4B/5B encoding scheme for control signals.

Referring to FIG. 5A, a serial transmitter 49 and serial receiver 31 are illustrated as coupled to each link 41. A variety of encoding schemes can be used for a serial line link 41 in the context of this invention, such as, SONET/SDH, 8B/10B Fiber Channel, and 4B/5B Fiber Distributed Data Interface (FDDI). In addition to the encoding and decoding of the data transmitted over the serial link, the serial ansmitter/receiver (49 and 31) sendstreceives control words for a variety of in-band control purposes, mostly unrelated to the present invention description.

However, one control word, time frame delimiter (TFD), is used in accordance with the present invention. The TFD marks the boundary between two successive time frames and is sent by a serial transmitter 49 when a CTR 002 clock tick occurs in a way that is described hereafter as part of the output port operation.

It is necessary to distinguish in an unambiguous manner between the data words, which carry the information, and the control signal or words (e.g., the TFD is a control signal) over the serial link 41. There are many ways to do this. One way is to use the known 4B/5B encoding scheme (used in FDDI). In this scheme, every 8-bit character is divided into two 4-bit parts and then each part is encoded into a 5-bit codeword that is transmitted over the serial link 41.

In a preferred embodiment the serial transmitter 49 and receiver 31 comprise AM7968 and AM7969 chip sets, respectively, both manufactured by AMD Corporation.

FIG. 5B illustrates an encoding table from 4-bit data to 5-bit serial codeword. The 4B/5B is a redundant encoding scheme, which means that there are more codeword than data words. Consequently, some of the unused or redundant serial codeword can be used to convey control information.

FIG. 5C is a table with 15 possible encoded control codeword, which can be used for transferring the time frame delimiter (TFD) over a serial link The TFD transfer is completely transparent to the data transfer, and therefore, it can be sent in the middle of the data packet transmission in a non-destructive manner.

When the communication links 41 are SONET/SDH, the time frame delimiter cannot be embedded as redundant serial codeword, since SONET/SDH serial encoding is based on scrambling with no redundancy. Consequently, the TFD is implemented using the SONET/SDH frame control fields: transport overhead (TOH) and path overhead (POH). Note that although SONET/SDH uses a 125 microseconds frame, it cannot be used directly in accordance with the present invention, at the moment, since SONET/SDH frames are not globally aligned and are also not aligned to UTC. However, if SONET/SDH frames are globally aligned, SONET/SDH can be used compatibly with the present invention.

FIG. 7 is a schematic block diagram of an input port with a routing controller. As shown in FIG. 7, the input port 30 has several parts including: serial receiver 31, a routing controller 35 and separate queues to the output ports 36. The serial receiver 31 transfers the incoming data packets and the time frame delimiters to the routing controller 35.

The routing controller 35 comprises a controller 35B that is constructed of a central processing unit (CPU), a random access memory (RAM) for storing the data packet, read only memory (ROM) for storing the routing controller processing program; and a routing table 35D that is used for determining the output port that the incoming data packet should be switched to.

FIG. 6A is an illustration of a data packet structure with a header that includes a time stamp, two priority bits, a multi-cast bit, and an attached time of arrival (ToA), port number, and link type. FIG. 6B is additional detail about the encoding of the priority and multi-cast bits of FIG. 6A.

The incoming data packet consists of a header and a payload portion. The header includes, as shown in FIGS. 6A and 6B, a time stamp value 35TS, a multi-cast indication 35M, a priority indication 35P, and a virtual PID indication 35C. The priority indication 35P may include encoding of a high and a low priority. In an alternate embodiment, multiple levels of priority are encoded by priority indication 3SP. In a preferred embodiment the multiple levels of priority include Constant Bit Rate (CBR) priority, Variable Bit Rate (VBR) priority, Best Effort (BE) priority, and Rescheduled priority. The multi-cast indication 35M may include encoding indicating one destination or a plurality of destinations. In the case of a plurality of destinations there can be one or more PIDS.

Referring back to FIG. 7, the incoming data packet header includes a virtual pipe identification, PID 35C, that is used to lookup in the routing table 35D the address 35E of the queue 36 that the incoming data packet should be transferred into.

Before the incoming data packet is transferred into its queue 36, the time of arrival (ToA) information 35T is attached to the data packet header as illustrated in FIGS. 6A and 6B. The ToA information is the value of the common time reference (CTR) signal 002 at the time the incoming data packet arrived at the input port In a preferred embodiment, the ToA 35T may additionally comprise a port number and a link type indication. The ToA 35T is used by the scheduling controller 45 of the output port 40 in the computation of the forwarding time out of the output port, and shown in FIG. 9. Note that the ToA 35T value that is appended to the incoming data packet is distinct and separate from the time stamp value 35TS that is included as part of the incoming data packet header. After the incoming data packet has the ToA information appended to it, it is routed by the routing controller 35B via respective buses (31-1, 31-N) to the respective appropriate queue 36.

The ToA 35T and time stamp 35TS can have a plurality of numerical formats. For example, the format of the Network Time Protocol [D. Mills, Network Time Protocol (version 3) IETF RFC 1305] is in seconds relative to 0h UTC on Jan. 1, 1900. The full resolution NTP timestamp is a 64-bit unsigned fixed point number with the integer part in the first 32 bits and the fractional part in the last 32 bits. In some fields where a more compact representation is appropriate, only the middle 32 bits are used; that is, the low 16 bits of the integer part and the high 16 bits of the fractional part. The high 16 bits of the integer part must be determined independently.

The incoming data packet can have various formats, such as but not limited to Internet protocol version 4 (IPv4), Internet protocol version 6 (IPv6), and asynchronous transfer mode (ATM) cells. The data packet's PID 35C can be determined by but is not limited to one of the following: an Internet protocol (IP) address, an asynchronous transfer mode (ATM) a virt circuit identifier, a vitala path identifier (VCI/VPI), Internet protocol version 6 (IPv6) addresses, Internet Multi Protocol Label Swapping (MPLS) or tag switching labels, and an IEEE 802 MAC (media access control) address.

FIG. 8 illustrates the flow chart for the router controller 35 processing program executed by the routing controller 35B. The program is responsive to two basic events from the serial receiver 31 of FIG. 7: the received time frame delimiter TFD at step 35-01, and the receive data packet at step 35-02. After receiving a TFD, the routing controller 35 computes the time of arrival (ToA) 35T value at step 35-03 that is to be attached or appended to the incoming data packets.

For the computation of the ToA information 35T the routing controller uses a constant, Dconst, which is the time difference between the common time reference (CTR) 002 tick and the reception of the TFD at time t2 (generated on an adjacent switch by the CTR 002 on that node). This time difference is caused by the fact that the delay from the serial transmitter 49 to the serial receiver 31 is not an integer number of time frames.

When the data packet is received at step 35-02, the routing controller 35B executes the four operations as set forth in step 35-04: attach the ToA information, lookup the address of the queue 36 using the PID, storing the data packet in that queue 36, and decode and process multi-cast indication 35M.

The first operation of step 35-04 attaches or appends the ToA information computed in step 35-03 to the incoming data packet. The ToA information 35T may also include link type and port information, as discussed above. The second operation in step 35-04 uses the PID 35C to reference lookup table 35D to determine the address of the output port 35E of the selected output port queue. The third operation of step 35-04 copies, forwards, or transfers the incoming data packet to the queue 36 responsive to the address 35E.

The fourth operation of 35-04 (decode and process multi-cast indication) may also comprise the method of copying the incoming data packet with appended or attached ToA information into a plurality of the queues 36 to effect a simultaneous multiast forwarding operation where the incoming data packet is simultaneously forwarded to more than one output port queue.

There are various ways to implement the switching fabric 50. However, the switching fabric is peripheral to the present invention, and so it will be described only briefly. The main property that the switching fabric should ensure is that data packets for which the priority indicator (35P in FIGS. 6A and 6B) is set to high, CBR, or VBR, then priority (i.e. reserved traffic) will be switched into the output port in a constant bounded delay, measured in time frames.

This is possible in accordance with the present invention, where the data packets in the input ports are already separated into queues to their respective output ports. Then, by using the Clos theorem in the time domain (see *Switching and Traffic Theory for Integrated Broadband Networks*, J. Y. Hui, page 65), the delay can be bounded by a duration equal to two time frames, wherein one time frame duration is consumed at the input port and one time frame duration is consumed to get across the switching fabric. Other implementations can be used, such as based on shared bus with round robin service of the high priority data packets, or on a crossbar switch.

Another possible switch design is shared memory, which ensures a deterministic delay bound from an input port to an output port Shared memory data packet switches are commercially available from various vendors, for example, MMC Networks Inc. (Santa Clara, Calif.).

The output port 40 is illustrated in FIG. 9, comprised of a scheduling controller with a transmit buffer 45, and serial transmitter 49 as previously described herein. The scheduling controller 45 performs a mapping of each of the data packets between the associated respective time of arrival (ToA) and an associated forwarding time out of the output port via the serial transmitter 49. The forwarding time is determined relative to the common time reference (CTR) 002. Data packets arrive from the switching fabric via coupling 51 to the scheduling controller and transmit buffer 45. Scheduled data packets are forwarded out of the scheduling controller and transmit buffer 45 via couplings 47A, 47C to the serial transmitted 49. The serial transmitter 49 forwards outgoing data packets via communications link 41.

Referring to FIGS. 10–12, the scheduling controller and transmit buffer 45 operation and structure are described. As shown in FIG. 10, the scheduling controller and transmit buffer 45 comprises a data packet scheduling controller 45A coupled to transmit buffers 45C via connections 45-1, 45-2, . . . 45-k', and 45-be. The transmit buffers 45C are coupled via connections 47-1, 47-2, . . . 47-k', and 47-be to the select buffer controller 45D.

The data packet scheduling controller 45A, together with the select buffer controller 45D, perform the mapping, using the PID 35C and the data packet time of arrival (ToA) 35T in order to determine the respective time frame a respective data packet should be forwarded out of the output port. Both controllers 45A and 45D are constructed of a central processing unit (CPU), a random access memory (RAM) for storing the data, and read only memory (ROM) for storing the controller processing program. The data packet scheduling controller 45A additionally comprises a forwarding table 45B.

Data packets arrive from the switching fabric 50 (not shown) via link 51. Data packets which have high priority, as determined by priority indicator 3SP, are switched by the scheduling controller 45A to one of the k transmit buffers 45C (B-1, B-2, . . . , B-k'). Each of the transmit buffers is designated to store data packets that will be forwarded in each of the respective time frames in every time cycle, as shown in FIG. 4. Data packets which have low priority, as determined by priority indicator 35P, are switched by the scheduling controller 45A to the transmit buffer B-E for "best effort" transmission. Low priority traffic is non-reserved and may include "best effort" traffic and rescheduled data packets.

The common time reference (CTR) signal 002 is coupled to the data packet scheduling controller 45A and the select buffer controller 45D and provides for timely transmission of outgoing data packets.

The flow chart for the program executed by the data packet scheduling controller 45A is illustrated in FIG. 11. When the data packet is received from the switch fabric 50 at step 45-03, the PID 35C and the time stamp 35TS in the data packet header are used to look-up the forward parameter 45F in the forwarding table 45B, as specified in step 45-04. Next, the index i of the transmit buffer 45C, between B-1 and B-k', is computed in step 45-05 by subtracting the time of arrival ToA 35T from the common time reference CTR 002 and by adding the forward parameter 45F. As shown in step 45-06, after the index i is computed, it is used to schedule the data packet from the switch fabric to transmit buffer B-i.

The flow chart for the program executed by the select buffer controller 451D is illustrated in FIG. 12. The controller 45D determines if a common time reference (CTR) tick 002 is received at step 45-11. If the common time reference tick is received, step 45-12 increments the transmit buffer index i (i.e., i:=i+1 mod k', where k' is the number of buffers for scheduled traffic, one for each time frame in a time cycle). The controller 45D also sends a time frame delimiter TJH to the serial transmitter at step 45-12.

At step 45-13 the transmit buffer Bi is checked to see if it is empty. If it is not empty, step 45-14 forwards the data packet present in transmit buffer B4 via link 47C to transmitter 49. If the determination of step 45-13 is that transmit buffer B4 is empty, then time frame i is available for best-effort traffic. For best-effort traffic, step 45-15 forwards the data packet present in transmit buffer B-E via link 47C to transmitter 49.

It is an object of the present invention to convey audio (e.g., telephone, music) or visual (e.g., video), or any combination of audiovisual communications (e.g. video phone, video with sound) via scheduled data packets over a synchronous virtual pipe. The preferred embodiment of the present invention schedules the assembly of digital samples into data packets in coordination with the common time reference so that a data packet is complete and prepared for transsission within a scheduled respective time frame for all associated time cycles This scheduling is performed by taking a predefined and known amount of time that the assembly and any other processing will require and subtracting that from the scheduled time frame. If the assembly of digital samples into data packets starts at the scheduled start time, it will complete just in time for transmission on the scheduled time frame over the synchronous virtual pipe. It is to be appreciated that this scheduling reduces the latency incurred by each data packet to the minimum possible; and that since data packets are conveyed by a synchronous virtual pipe, the jitter of the arrival times of the data packets at their destination is well-defined and bound to a small value. Both minimal latency and minimal jitter are practical requirements for conveying telephone, video, and many other forms of audio, visual, and audiovisual communications via data packets.

FIG. 14 is a timing diagram illustrating processing, assembly of digital samples into data packets, and on-time transmission of data packets of the present invention. The controller 81 is responsive to receipt of digital samples and collects and assembles data packets of the digital samples over time. The collection and assembly of data packet 1*a* is shown to start within time frame 2 of time cycle 0 in the example timing of FIG. 14. The collection and assembly of data packets completes within an interval that is typically equal to the duration of one time cycle, and repeats the process beginning and ending at the same relative time frames within the associated time cycles for each time cycle.

In the illustrated example timing, the assembly of data packet 1a completes 99 time frames later, in time frame 1 of time cycle 1.

In another embodiment, the operation of collection and assembly of data packets may complete within a predefined number of time cycles. Furthermore, the operation of collection and assembly of data packets can last a predefined number of time frames, which can be larger than a time cycle or smaller than a time cycle. In the case when the operation of collection and assembly of data packets lasts longer than a time cycle, the present invention supports multiple simultaneous collection and assembly operations in a pipelined fashion. In some cases the duration of successive operations of collection and assembly of data packets can be different; this is very common for most visual and audiovisual data types.

In an alternate embodiment, the operation of collection and assembly of data packets may additionally comprise the method of converting analog voice signals into digital samples, prior to assembly of the digital samples into a data packet. In this alternate embodiment, the scheduling also factors in the additional time required to receive the converted digital samples from an analog to digital converter.

In an alternate embodiment, the operation of collection and assembly of data packets may additionally comprise the method of converting analog video signals into digital samples, prior to assembly of the digital samples into a data packet In this alternate embodiment, the scheduling also factors in the maximum additional time required to receive the converted digital samples from an analog to digital converter.

In yet another alternate embodiment, the operation of collection and assembly of data packets may additionally comprise the method of data compression, wherein the digital samples are compressed to further reduce the data packet bandwidth, or to reduce the data packet size required. In some cases the compression operation is performed on a group of block of digital samples with a predefined size or duration. In the case of data originating as visual (e.g. video signals), the compression operation may be performed on a group of block of digital samples within a predefined image region, size, or duration.

As shown in FIG. 14, the data packet is then transmitted 1b via the SVP switch 10 to a synchronous virtual pipe during a predefined time frame. In the illustrated example, the set of digital samples assembled into a data packet are transmitted 1b starting at time frame 1 of time cycle 1. The transmission 1b occurs simultaneously with the start of the operation of collection and assembly of data packet 2a, and the process repeats in time for subsequent time cycles.

FIG. 14 shows the timing of the regular collection and assembly of data packets and virtually immediate transmission of the data packet of digital samples of the present invention. Data packets are scheduled for immediate transmission within reserved time frames, thus congestion and routing latency within the initiating VoIP gateway are eliminated in the present invention.

FIG. 15 is a timing diagram illustrating the receipt, separation of digital samples from the data packets, and other processing of data packets of the present invention. The controller 81 is responsive to receipt of data packets comprising digital samples from a synchronous virtual pipe. The data packets arrive regularly 1d at a predefined time frame in each time cycle, which is time frame 2 in the illustrated example. The separation 1e of digital samples from the data packets is scheduled within the VoIP gateway of the present invention to immediately separate the digital samples from the data packet thus providing an output of digital samples. The output of digital samples is then relayed to an external device, which in the preferred embodiment for analog telephone is a digital to analog converter.

The regularity of arriving data packets at the same time frame of each time cycle provides for uninterrupted receipt of packets of digital samples, which in turn provides for uninterrupted receipt of digital samples at the digital to analog converter. The jitter present in the received data packet arrival times is controlled by the common time reference to be very small and well-bounded. Because the separation of digital samples from a data packet can be scheduled to occur as soon as the data packet arrives at the VoIP gateway, the effects of latency on the data packets are minimized.

Further supporting telephone communications, the operations of collecting and assembling digital samples into data packets may additionally comprise an echo cancellation operation, in which copies of the digital samples are stored locally in a buffer, and then used in comparison with received digital samples. As a result of the comparison, an echo cancellation signal can be generated to eliminate or reduce the echo caused by the transmitted digital samples being attenuated and retuned to the sender by voice equipment at the far end.

The echo cancellation process as described is an improvement over all prior art in that since both ends are based from the common time reference CTR signal 002, and all other transit delays and jitter in the system are known a priori or are well-bounded, it is possible to very precisely align the stored samples with the retrieved samples in time.

It is another object of the present invention to convey multiple telephone communications via scheduled data packets over a synchronous virtal pipe. A preferred embodiment of the present invention schedules the assembly of a plurality of digital sample streams into data packets in coordination with the common time reference so that a data packet is complete and prepared for transmission within a scheduled respective time frame for all associated time cycles.

This scheduling is performed by taking a predefined and known amount of time that the assembly of a data packet will require and subtracting that from the scheduled time frame. If the assembly of digital samples into a data packet starts at the scheduled start time, it will complete just in time for transmission on the scheduled time frame over the synchronous virtual pipe. It is to be appreciated that this scheduling reduces the latency incurred by each data packet to the minimum possible; and that since data packets are conveyed by a synchronous virtal pipe, the jitter of the arrival times of the data packets at their destination is well-defined and bound to a small value. In fact, the jitter can be reduced to timing error associated with the clock signal from GPS, which can be maintained below one microsecond. Both minimal latency and minimal jitter are requirements for conveying telephone communications and other real-time audio, visual, and audiovisual streams via data packets.

The scheduled assembly takes the digital samples from a plurality of digital sample streams and collects and assembles them into a data packet. The data packet thus can contain a fragment of a plurality of simultaneously occurring telephone communications or other types of real-time streams The data packet may then be routed via a synchronous virtual pipe to its destination. The method of combining multiple telephone communications together into a data packet provides for reducing the cost of the overhead associated with transmitting each telephone conversation, as the overhead of collection, assembly into data packets, and routing is then shared among all the telephone communications conveyed within the same data packet Mhis combining is practical for telephone communications primarily because of the low data rate requirements associated with voice telephone communications. In one embodiment, the overhead associated with transiitting a data packet is fixed at 40 bytes. In this embodiment, collecting ten incoming voice streams could be assembled into data packets and routed together, thus reducing the effective overhead for any one stream of digital samples to 4 bytes, or alternatively, reducing the delay associated with collection and assembly of digital samples into data packets.

FIG. 16 is a timing diagram illustrating multiplexing of multiple real-time streams (e.g., telephone calls) into one data packet in the present invention. The controller 81 is responsive to receipt of multiple streams of digital samples and collects and assembles the samples over time into a data packet. The collection and assembly of digital samples 1$a$, 1$a'$, 1$a''$ into a data packet is shown to start within time frame 1 of time cycle 0 in the example timing of FIG. 16. As shown, the collection and assembly of a data packet can complete within an interval less than or equal to the duration of one time cycle, and therefore repeats the process beginning and ending at the same relative time frames within the associated time cycles for each time cycle. In the illustrated example timing, the collection and assembly of digital samples into a data packet 1$a$ completes 99 time frames later, in time frame 100 of time cycle 0.

In an alternate embodiment, the operation of collection and assembly of digital samples into a data packet may additionally comprise the method of converting analog voice signals into digital samples for one or more of the streams of digital samples, prior to assembling the digital samples into a data packet In this alternate embodiment, the scheduling also factors in the additional time required to receive the converted digital samples from the analog to digital converter.

The data packet representing the digital sample inputs 1$a$, 1$a'$, 1$a''$ is then transmitted 1$b$ via the SVP switch 10 to a synchronous virtual pipe during a predefined time frame. In the illustrated example, the data packet of digital samples assembled at 1$a$ are transmitted 1$b$ starfing at time frame 1 of time cycle 1. The transmission 1$b$ occurs simultaneously with the start of the operation of collection and assembly of digital samples into a new data packet of new samples 2$a$, 2$a'$, 2$a''$, and the process repeats in time for subsequent time cycles.

FIG. 17 is a timing diagram illustrating demultiplexing of data packets into multiple streams (e.g., telephone calls) in the present invention. The controller 81 is responsive to receipt of data packets comprising a plurality of streams of digital samples from a synchronous virtual pipe. The data packets arrive regularly 1$d$ at a predefined time frame in each time cycle, which is time frame 3 in the illustrated example. The separation of digital samples from the data packet of snms of samples 1$e$, 1$e'$, 1$e''$ is scheduled, within the VoIP gateway of the present invention, to provide immediate separation of the data packet for each output stream thus providing a plurality of outputs of digital samples. Each output of digital samples is then relayed to an external device, which in the preferred embodiment are digital to analog converters supporting, for example, a conventional analog telephone. In an alternate embodiment, the external device can be a digital phone, a digital video display, or any other form of digital audio, visual, or audiovisual device.

The regularity of arriving data packets at the same time frame of each time cycle provides for uninterrupted receipt of packets of digital samples, which in turn provides for uninterrupted receipt of multiple streams of digital samples at each of the digital to analog converters. The jitter present in the received data packet arrival times is controlled by the common time reference to be very small and well-bounded. Because the separation of digital samples from the data packet can be scheduled to occur as soon as the data packet arrives at the VoIP gateway, the effects of latency on the data packets are minimized.

As shown in FIGS. 16–17, this embodiment of the present invention permits multiple telephone communications to be conveyed via a single synchronous virtual pipe. One or more telephone communications are assembled together into data packets and the respective data packets are forwarded at predfined time frames through a synchronous virtual pipe to a destination, where the digital samples in the data packets are separated and directed to respectively one or more telephone communication destinations. The present invention permits telephone conversations to thus be trunked via synchronous virtual pipes to reduce the overhead associated with assembly of data packets and conveyance of data packets. This reduction in overhead is practical as a result of the relatively low data rate required for voice telephone communications.

It is to be appreciated that multiple telephone communications can be independently converted, collected, and assembled into data packets in accordance with the description above for a single telephone communication, such that each of the multiple telephone communications results in a corresponding respective set of data packets. Each of the data packets is thus independently scheduled and transmitted over the synchronous virtual pipe. The scheduling may transmit multiple data packets within one or more time frame. Assembly of multiple streams of voice data independendy into multiple data packets is an optional method of operation when the telephone communications are permitted to travel over the same synchronous virtual pipe to a similar destination.

FIG. 18 illustrates both a schematic block diagram of an end-to-end VoIP connection showing one implementation of a trunked phone communication as described Us above and with respect to FIGS. 16–17, and also shows a composite timing diagram showing end-to-end timing illustrating the timing of the schematic block diagram of an end-to-end VoIP connection. In the illustrated figure, multiple streams of digital samples are conveyed to the controller 81 of VoIP gateway A 80 via digital sample inputs 82. The VoIP gateway 80 additionally comprises, as described above, an output port 40 coupled via communication link 41 to zero or more SVP switches 10, e.g. B, C. The zero or more SVP switches 10 comprise a virtual pipe 25, wherein each of the switches 10 is coupled to the next switch 10 in the virtual pipe 25 by a link 41.

The virtual pipe begins at VoIP gateway A 80 and ends at VoIP gateway D 80 which as described above incorporates an input port 30 and a controller 81. The controller 81 couples a plurality of outgoing streams of digital samples via links 83.

The bottom of FIG. 18 illustrates a timing diagram of the operation of the logical connection as shown in the top of FIG. 18. Time progresses in the downward direction in this timing diagram.

Conversion of analog voice to digital samples and the assembly of same digital samples into data packets occurs at times 1A/D, 2A/D, and 3A/D as shown in the figure. These conversion and assembly operations are scheduled to start once per time cycle at a predefined time frame.

The data packets enter the synchronous virtual pipe at the output port 40 of the VoIP gateway A 80 in order and once per time cycle at a predefined time frame. The transmission of data packets via the synchronous virtual pipe is scheduled to occur once each time cycle at a predefined time frame. The actual transit times of data packets via the synchronous virtual pipe are shown as 1BCD, 2BCD, and 3BCD in FIG. 18. Due to the nature of the synchronous viural pipe, the data packets arrive in order and once per time cycle at predefined time frames at the input port 30 of the destination VoIP gateway D 80 as shown in FIG. 18.

The separation of digital samples from the data packets and conversion of digital samples to analog voice occurs during time intervals 1D/A, 2D/A, and 3D/A as shown. The separated digital samples are then routed simultaneously to the appropriate digital output links 83.

FIG. 1 illustrates the structure of a VoIP gateway of the present invention. The VoIP gateway 80 is comprised of a controller 81 coupled to an SVP switch 10. The controller 81 is also coupled via digital sample input links 82 and digital sample output links 83 to external voice devices (not shown).

FIG. 1 illustrates the structure of a VoIP gateway of the present invention. The VoIP gateway 80 is comprised of a controller 81 coupled to an SVP switch 10. The controller 81 is also coupled via digital sample input links 82 and digital sample output links 83 to external (e.g., voice) devices (not shown).

FIG. 19 is a schematic block diagram of time frame call multiplexing using headerless time-based routing of the present invention. The left half of FIG. 19 illustrates the structure of an alternate embodiment of the VoIP gateway. The VoIP gateway 80 is comprised of a controller 81 coupled to an SVP switch 10. The controller 81 is also coupled via digital sample input links 82 and digital sample output links 83 to external voice devices (not shown). The SVP switch 10 of FIG. 19 is also coupled to one or more synchronous virtual pipes 41 by way of combination input/output ports 30/40.

The SVP switch 10 of FIG. 1 is further comprised of a GPS receiver 20 linked via a common time reference (CTR) signal 002 to each of the input/output ports 30/40. In this manner, a common time reference is supplied to each of the input ports and each of the output ports within the SVP switch 10. The CTR signal 002 is also coupled to the controller 81 as shown in the figure.

The right half of FIG. 19 illustrates the timing of selected synchronous virtual pipes associated with the links 41. In the alternate embodiment of FIG. 19, the synchronous virtual pipes relay stripped data packets consisting solely of a payload portion. The header portion typically associated with data packets is not present with a stripped data packet. The links 41, which may each contain zero or more SVP switches 10 as previously described, convey stripped data packets using a time-based routing method.

FIGS. 19–20 depict a common time reference (CTR) 002 axis that is divided into time cycles. Each time cycle is divided into predefined time frames. Each of the time frame has predefined positions: a, b, c, and d of either fixed size (in time duration) or variable size (in time duration), consequently, the predefined position can have either fixed size data packets or variable size data packets, respectively. Each time frame can be further divided into time slots. Time frames utilize packet delimiters (PDs) 35C. The PDs can be one of the control codewords as shown in FIG. SC. PDs are used to indicate separations; packet delimiters can then be used to distinguish between multiple headerless data packets in the same time frames; and when using PDs in headerless time-based routing, the headerless data packets are permitted to have zero length. Time slots have a predetermined length or lengths and do not use packet delimiters. In an alternate embodiment, time slots may be delimited using a different delimiter than the one used as PDs.

When using the time-based or position-based routing method of the alternate embodiment of the present invention, the position of the stripped data packet within a time cycle determines its destination. As shown symbolically in the right side of FIG. 19 and in FIG. 20, stripped data packets a, b, c, and d in each time slot are respectively in the four consecutive time slots or positions within each time frame. Each first time slot or position in any time frame contains stripped data packets a, each second time slot or position in any time frame contains stripped data packets b, and so on as shown in the figure. The operation of the routing controller 35 in the present embodiment is similar to that shown in FIG. 7, except that the values used to index into the lookup table 35D is a time slot or position counter maintained by the controller 35B responsive to the packet delimiter signal 35C. In one variant embodiment, the value of the time slots within a time frame and the time frames within a time cycle may be alternatively defined by an in-band control codeword signal as discussed above.

The present invention permits use as a call center, routing telephone communications from a plurality of origination points to a plurality of destination points and vice versa. This operation may include multi-party conference calls, using the multicasting routing provided by the switches in the synchronous virtual pipe of the present invention. Providing a conference call capability for large numbers of users is made easier by the use of a common time reference signal to coordinate the analog to digital conversion, the multiplexing, the assembly, the switching and routing, the separation, the demultiplexing, and the digital to analog conversion all to the same common timebase.

FIG. 21A is a composite amplitude versus time diagram of echo cancellation using CTR/UTC as in the present invention. As shown in a first amplitude versus time graph 2100, the samples representing a time-varying waveform 2110 (e.g. for voice communications) are graphed on an amplitude axis versus a time axis. These samples are stored locally on the transmitting end of the system and send over the synchronous virtual pipe to their destination. At the far destination end, the samples are subject to re-transmission back to the transmitting end at an unknown but reduced amplitude, as it is functionally shown in FIG. 21B. The re-transmitted samples representing a time-varying waveform 2160 are shown in a second amplitude versus time graph 2150.

Echo cancellation could be performed by subtracting a proportion of waveform 2110 from the waveform 2130 received with echo waveform 2160 resulting in a waveform representative of solely the information content of the intended waveform from the far destination end. In practice, this operation is difficult in the prior art because both the delay of the received samples relative to the transmitted samples and the attenuation applied to the samples at the far destination end are unknowns. The difficulty lies in time-correlating the echo waveform against the stored original transmission. As provided by the present invention, the use of the common time reference (CTR) signal permits very accurate correlation in time between the stored waveform and the received echo waveforn, reducing the problem to simply matching the amount of attenuation at the far destination, which is a significantly easier computation.

FIG. 22 is a description of the formulations used for echo cancellation in the present invention. As previously described, the present invention considerably eases the difficulty of performing echo cancellation by ensuring that the time-correlation between samples sent and samples received is well-defined. The echo cancellation problem reduces to computing the desired output signal without echo d by subtracting the expected or estimated echo contribution e' from the received signal r. The received signal r can be further characterized by considering it the combination of the intended transmission from the far side y plus the echo contribution signal e. EQ. 1 in FIG. 22 shows that as a function of sample k, which is correlated throughout the present invention by the use of the CTR, the desired signal d(k) is equivalent to r(k)−e'(k), which is in turn equivalent toy(k)+e(k)−e'(k).

In practice, simply subtracting the expected or estimated echo signal from the received signal may be insufficient to satisfactorily reduce the echo. This is often the case because a present echo may be the result of a much earlier echo signal that was not completely removed; as a result, the present echo may have components of a plurality of echo signals from various times in the pasl A more sophisticated embodiment of the present invention utilizes a more comprehensive stored history of transmitted digital samples accompanied by a series of weighting factors h, thus permitting a plurality of echo components to be simultaneously canceled or reduced. The equation governing the more sophisticated embodiment of echo cancellation is shown as EQ. 2 in FIG. 22, where h(n) represents the stored echo signal as transmitted and h'(n) represents the estimated received echo signal, as in the signals e and e', for an echo in transit a total of n times. In the illustrated equation, the limit N determines the number of discrete sets of samples must be stored locally and the number of the plurality of older echoes that can be canceled in the present invention. Again, the knowledge of CTR decreases the number of sets of samples and the dimension of each set It can also readily be seen that the present invention is not limited to telephone communications, but is readily applicable to high quality audio applications such as music and theatrical sound. Additionally, with sufficient bandwidth available the present invention is applicable to the fields of video, television on demand, and HDTV as conveyed via data packets over a synchronous virtual pipe, including other variants of audio, visual, and audiovisual forms of communication.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A gateway control system comprising:
   a source of a common time reference signal;
   a source of a steam of digital samples;
   a packeting subsystem for providing packetization of a plurality of the digital samples into a data packet; and
   a controller for defining a plurality of predefined time frames responsive to the common time reference signal, and for scheduling of transmission of associated respective ones of the data packets at respective selected ones of the predefined time frames;
   wherein the packeting subsystem provides packetization responsive to the controller, and wherein the packetization of each of the respective ones of the data packets is scheduled for completion prior to the respective selected predefined time frame.

2. The gateway control system as in claim 1, wherein each respective one of the data packets is output from the gateway system during the respective selected predefined time frame.

3. The gateway control system as in claim 1, wherein, for each respective one of the data packets, the packetization of the plurality of the digtal samples into the data packets is completed immediately prior to the respective selected predefined time frames.

4. The gateway control system as in claim 1, wherein the time frames are scheduled and structured into a time cycle comprised of a fixed number of contiguous time frame positions which are structured into a stream of a plurality of contiguous time cycles.

5. The gateway control system as in claim 4, wherein the scheduling of transmission of respective data packets occurs at a defined one of the time frame positions within each of the time cycles.

6. The gateway control system as in claim 5, wherein the scheduling of transmission of respective data packets occurs at multiple defined ones of the time frame positions within each of the cycles.

7. The gateway control system as in claim 4,
   wherein a fixed number of a plurality of contiguous ones of the time cycles comprise a super cycle, wherein the super cycle is periodic; and
   wherein the scheduling of the transmission of respective data packets occurs at a defined one of the time frame positions periodically during at least one associated respective one of the time cycles during each of the super cycles.

8. The gateway control system as in claim 4,
   wherein a fixed number of a plurality of contiguous ones of the time cycles comprise a super cycle, wherein the super cycle is periodic; and
   wherein the scheduling of transmission of respective data packets occurs at least at one of the defined time frame positions within each of the super cycles.

9. The gateway control system as in claim 1, wherein the common time reference signal is coupled from a GPS (Global Positioning System).

10. The gateway control system as in claim 1, wherein the common time reference signal is provided in accordance with the UTC (Coordinated Universal Time) standard.

11. The gateway control system as in claim 10, wherein the super cycle duration is equal to at least one of a predefined number of seconds and a predefined fraction of a second, as measured using the UTC standard.

12. The gateway control system as in claim 1, wherein the stra of digital samples are at least one of digitized analog voice telephony, digitized uncompressed voice telephony, digitized compressed voice telephony, narrowband Integrated Service Digital Networks (ISDN), video, television (TV), high definition TV (HDTV), and high fidelity (Hi-Fi) audio.

13. The gateway control system as in claim 1, wherein there are a plurality of streams of digital samples; and
   wherein the packeting subsystem provides for packetization of the data packets for each of the plurality of streams.

14. The gateway control system as in claim 13, wherein the packeting subsystem provides for the packetization of the plurality of the digital samples from the plurality of the streams of digital samples into a single data packet; and wherein the packetization starts and ends synchronous to the common time reference signals.

15. The gateway control system as in claim 14, wherein each of the respective data packets further comprises a payload with plurality of predefined positions; and wherein there is one respective predefined position in said payload for each of the streams for the digital samples from each of the streams in the respective data packet.

16. The gateway control system as in claim 15, wherein each one of the predefined positions has an associated predefined maximum length.

17. The gateway control system as in claim 15, wherein a position delimiter is provided between each of the predefined positions.

18. The gateway control system as in claim 15, wherein each one of the predefined positions has an associated respective predefined position number, wherein the controller uniquely associates the position number with a respective one of the plurality of streams of digital samples.

19. The gateway control system as in claim 15, wherein each of the predefined positions has an identifier uniquely associated with a respective one of the plurality of streams of digital samples.

20. The gateway control system as in claim 1, wherein a time reference of defined positions within defined time frames is determined responsive to the common time reference signals;

wherein the packeting subsystem provides means wherein each of the data packets is assigned an associated one of the defined positions within a one of the defined time frames, responsive to the common time reference signals.

21. The gateway control system as in claim 20 wherein the defined positions are time slots each having a common defined time interval.

22. The gateway control system as in claim 20, wherein the packetized data packets are further comprised of a header.

23. The gateway control system as in claim 20, wherein the packetized data packets are without a header.

24. The gateway control system as in claim 1, further comprising an analog to digital converter for generating the stream of digital samples.

25. The gateway control system as in claim 1, wherein each of the time frames is comprised of a plurality of predefined positions;

wherein there are a plurality of steams of digital samples;

wherein the packeting subsystem provides for the packetization of a plurality of the digital samples from each one of a respective pluaity of the streams of digital samples; and wherein the respective digital samples from each one of the respective streams has one respective predefined position in said time frame.

26. The gateway control system as in claim 25, wherein each of the predefined positions within each of the time frames has a predefined maximum length.

27. The gateway control system as in claim 25, wherein there is a position delimiter between each of the predefined positions within each of the time frames.

28. The gateway control system as in claim 25, wherein each of the predefined positions within each of the time frames has a predefined position number, wherein the controller uniquely associates the position number with a respective one of the plurality of streams of digital samples.

29. The gateway control system as in claim 25, wherein each of the predefined positions within each of the time frames has an identifier, wherein the controller uniquely associates the identifier with a respective one of the plurality of streams of digital samples.

30. The gateway control system as in claim 1, wherein the packetization further provides for compression of the digital samples in the data packets.

31. The gateway control system as in claim 1, further comprising:

tranmit data packet selection means for selecting selected ones of the data packets as transmit data packets for transmission;

storage apparatus for storing copies of the digital samples for each of the selected ones of the transmit data packets responsive to the transmit data packet selection means.

32. The gateway control system as in claim 31, further comprising:

data packet transmission means for transmitting the transmit data packets to a far-end gateway system;

data packet receiving means for receiving transmitted data packets from the far-end gateway system;

received data packet selection means for selecting selected ones of the transmitted digital samples in data packets from the far-end gateway system as received digital samples in data packets;

association means for associating each of the selected received digital samples in data packets to respective stored copies conesponding thereto responsive to the transmit data packet selection means and the received data packet selection means; and echo cancellation means for comparing the associated received digital samples in data packets to the respective stored copies in the storage apparatus, to provide an echo cancellation signal output responsive to the data packet receiving means, the association means, and the common time reference signal.

33. The gateway control system as in claim 32, wherein the echo cancellation signal is subtracted from the received digital samples in the received data packets from the far-end gateway system.

34. The gateway control system as in claim 32, wherein prior to comparing, the received data packets are depacketized to provide the received digital samples corresponding to the respective stored copies of the digital signals in the storage apparatus that were originally respectively packetized at the far-end gateway system; and wherein prior to the comparing, the received digital samples are time aligned to the stored copies of the digital samples using the common time reference signal.

35. The gateway control system as in claim 32, wherein the depacketization further provides for decompression of the digital samples in the data packets;

wherein prior to comparing, the received data packets are depacketized and decompressed to provide the received digital samples corresponding to the respective stored copies of the digital signals in the storage apparatus that were originally respectively packetized at the far-end gateway system;

wherein prior to the companng, the received digital samples are time aligned to the stored copies of the digital samples using the common time reference signal.

36. A receiving and decoding system for receiving and decoding data packets, each comprising a plurality of digital samples, the system comprising:

a source of a common time reference signal;

a source of pre-scheduled transmission during predefined time frames responsive to the common time reference signal, of a stream of data packets, wherein each of the data packets is comprised of digital samples;

wherein the pre-scheduled transmission by the source is responsive to the common time reference signal; and a depacketizer system for receiving and depacketizing each of the data packets to provide corresponding ones of the digital samples, responsive to the common time reference signal.

37. The receiving and decoding system as in claim 36, wherein there are a plurality of the data packets which arrive at a predefined rate with predefined intervals between the data packets; and wherein the depackefization of each of the data packets provides digital sample information having a duration of a predefined time interval.

38. The receiving and decoding system as in claim 37, wherein the predefined time interval is constant.

39. The receiving and decoding system as in claim 38, the system further comprising a controller for defining a plurality of predefined time frames responsive to the common time reference signal; and wherein each of the data packets are received in a predefined time frame synchronous with the common time reference signal.

40. The receiving and decoding system as in claim 39, wherein the data packets are compressed, and wherein the depackeizing further provides for decompression of the data packets.

41. The receiving and decoding system as in claim 40, wherein the compression is voice compression.

42. A virtual pipe communications system for communicating packetieed data over a virtual pipe comprised of a plurality of switches connected by communications links in a path, wherein a first switch within the virtual pipe is connected to receive the output of a first voice over Internet Protocol (IP) gateway and wherein a final switch within the virtual pipe is connected to provide an output coupled to transmit to a second voice over IP gateway, the system comprising:

a virtual pipe comprised of a plurality of switches connected by communications links in a path, each switch having addressable input ports and output ports;

a source of a common time reference signal, coupled to each of the switches in the virtual pipe and to the first and the second voice over IP gateway;

a controller for determining a plurality of predefined time frames responsive to the common time reference signal, and for determining a schedule of selected ones of the predefined time frames for packetization of respective packetieed data during the selected ones of the predefined time firames; and wherein the second voice over IP gateway is comprised of a depacketizing subsystem for depacketizing the packetized data to provide an output of a plurality of digital samples, responsive to the controller.

43. The virtual pipe communications system as in claim 42, wherein the second voice over IP gateway is further comprised of a digital to analog converter.

44. The virtual pipe communications system as in claim 42, wherein the depacketization subsystem completes the depacketization prior to the respective predefined time frame associated with the packetization of the respective packet data, responsive to the controller.

45. The virtual pipe communications system as in claim 42, wherein the packetized data is comprised of data from a plurality of separate original streams of digital samples;

wherein the depacketizing system provides for the depacketization of the packetized data into a plurality of separate streams of digital samples corresponding to the respective separate original streams of the digital samples.

46. The virtalm pipe communications system as in claim 42, wherein the packetized data is comprised of a plurality of sub-units, each associated with a separate one of the streams of digital samples, with each sub-unit delimited from other adjacent sub-units by a position delimiter;

wherein the depacketizing subsystem is responsive to the position delimiters for separating the respective packetized data into the respective associated plurality of separate streams of the digital samples.

47. The virtual pipe communications system as in claim 45, wherein the packetized data has a predefined structure that is comprised of a plurality of predefined sub-units of predefined size;

wherein the depacketizng subsystem provides the depacketization into the plurality of separate streams of digital data responsive to the predefined structure.

48. The virtual pipe communications system as in claim 42, wherein the packetized data is packetized voice data.

49. The virtual pipe communications system as in claim 45, wherein the separate original streams of digital samples are separate original streams of digital voice samples.

* * * * *